United States Patent [19]

Tatematsu et al.

[11] 3,716,676

[45] Feb. 13, 1973

[54] AUTOMATIC TELEPHONE DIALER UTILIZING MAGNETIC TAPE STORAGE WITH IMPROVED INDEXING MEANS

[75] Inventors: Kenzo Tatematsu, Amagasaki; Hiroo Hosono, Osaka; Toshio Katagiri, Neyagawa; Akira Nishikiori, Hirakata; Takashi Minato, Kadoma, all of Japan

[73] Assignee: Matsushita Electric Industrial Co., Ltd., Oaza Kadoma, Kadoma, Kadoma-shi, Osaka, Japan

[22] Filed: Dec. 28, 1970

[21] Appl. No.: 101,943

[30] Foreign Application Priority Data

| | | |
|---|---|---|
| Dec. 29, 1969 | Japan | 44/359 |
| Nov. 20, 1970 | Japan | 45/116148 |
| Dec. 15, 1970 | Japan | 45/113892 |
| Dec. 15, 1970 | Japan | 45/113891 |
| Dec. 15, 1970 | Japan | 45/113890 |
| Dec. 15, 1970 | Japan | 45/113889 |
| Dec. 4, 1970 | Japan | 45/107700 |

[52] U.S. Cl. ....................179/90 BB

[51] Int. Cl. ....................H04m 1/46

[58] Field of Search ...179/90 BD, 90 BB, 100.2 MD, 179/100.1 PS

[56] References Cited

UNITED STATES PATENTS

| | | | |
|---|---|---|---|
| 3,280,269 | 10/1966 | Brown | 179/90 BD |
| 3,511,940 | 5/1970 | Lemelson | 179/100.2 MD |
| 3,254,162 | 5/1966 | Miller | 179/90 BB |
| 3,479,470 | 11/1969 | Ham | 179/90 K |
| 3,325,602 | 6/1967 | Truby | 179/18 BA |
| 3,286,033 | 11/1966 | Lemelson | 179/100.2 MD |
| 2,944,116 | 7/1960 | Vershoven | 179/100.2 MD |

*Primary Examiner*—Kathleen H. Claffy
*Assistant Examiner*—Thomas D'Amico
*Attorney*—Stevens, Davis, Miller & Mosher

[57] ABSTRACT

An automatic dialling device in which dial impulses corresponding to dial digits of a telephone number are recorded in magnetic tape in advance and the recorded signals are reproduced as occasion demands thereby to automatically transmit the dial impulses to a telephone line for accomplishing a call. Said automatic dialling set specifically comprises a multiplicity of switches which can be individually operated to designate a multiplicity of parties to be called, wide magnetic tape having a multiplicity of transverse tracks and means for automatically selecting tracks corresponding to the called parties which have been designated.

21 Claims, 54 Drawing Figures

AUTOMATIC TELEPHONE DIALER UTILIZING MAGNETIC TAPE STORAGE WITH IMPROVED INDEXING MEANS

The present invention relates to an automatic dialling device.

The conventional automatic dialling device using a wide magnetic tape involves manual operations for track selection in most cases and, even with an electric motor, is so inconvenient that fine adjustment is necessary. For example, according to a conventional device which has traverse tracks in a wide tape and in which a relative speed is obtained by moving a head in a traverse direction, the magnetic tape is rapidly fed in the longitudinal direction by means of an electric motor and then a final adjustment is conducted manually for track selection. This device which is methodologically different from an embodiment of the present invention described later has a disadvantage that an accurate relative speed cannot be achieved because of the shortness of the recording tracks.

Another disadvantage of the conventional device is that since endless looped tape which is large in width is used, the tape is often corrugated while feeding it in the longitudinal direction, resulting in unstable recording-reproduction characteristics which are the causes of frequent misdialling, and for this reason it is difficult to shorten the distances between the tracks. Further, there is no conventional device in which automatic quick reversal of the tape feed is possible to reel back the tape for an erasing operation at a desired time. Also, in view of the fact that the amount of impulse recorded is not always the same, it sometimes happens that even though it becomes clear that the line is busy on completion of transmission of the recorded impulses, it is impossible to dial another party until the tape completes one cycle. Nor is it possible to restore immediately the device to the original condition by erasing the recorded information even if a wrong number is called.

There is no conventional automatic dialling device with magnetic tape which employs one-touch operations by use of push buttons with the names of parties-to-be-called written on them. But a device is known in which magnetic cores are arranged to form a matrix with each row and column allotted to an order and digits of a dial number respectively and a single electric cord is laid through the magnetic cores which store dial numbers, while shift and number selections are performed by means of a rotary selector switch and the selected number is read by a reading coil so that impulses are sent out as the rotary selector is being shifted. A big disadvantage common to all of these devices is that it is not easy to store a number to the inconvenience of a subscriber who wants to change his number, and also they are very expensive due to their construction.

There is still another known device which employs punched cards or the like as a recording medium, but it is needless to say that preparation and storage of the cards causes much inconvenience.

According, it is an object of the present invention to simplify operations of recording telephone numbers and performing automatic dialling oscillations.

Another object of the present invention is to provide a device in which, in order to simplify said operations, tracks are selected and magnetic tape fed automatically at the mere depression of a switch among a group of switches which are adapted to be individually operated.

According to the present invention, tracks are selected in a shorter time by detecting both the present position and an intended position of a magnetic head automatically and thereby determining the direction in which the magnetic head is to be moved.

Also, the device of the present invention employs a unique tape pad whereby the magnetic tape gets in contact with the magnetic head for high precision recording and reproducing operations, while the contact is released at the time of reeling back the magnetic tape to enable a high speed reel-back.

In addition, the device of the present invention has the magnetic tape tension-suspended between two rollers and therefore it is possible to improve the roller construction.

Still another advantage of the invention is that the direction of magnetic tape feed can be reversed by simple operations.

Furthermore, the present invention makes it possible to record telephone numbers by use of a dialling set of a telephone.

Still another object of the present invention is to provide a means for preventing erroneous pulses due to erroneous operations at the time of power failure or an end thereof from being transmitted to a main wire, and at the same time detecting the stoppage of the power failure.

The present invention simplifies its circuit by combining a voice amplifier circuit for confirming the condition of the telephone line and the answer sound of the called party with a circuit for generating a ringing tone.

As will described with reference to embodiments later, the automatic dialling set according to the invention comprises operating units including a magnetic tape unit which is mounted from under a base plate of the device and in which ends of the magnetic tape are bonded and wound on two drums supported by a frame; a tape drive unit which rotates the magnetic tape unit in both directions to run the tape, that is to say, switches the tape feed to the positive direction at the time of recording or reproducing and to the reverse direction at the end thereof to reel back the tape at a high speed; a cam unit or tape feed position control means which detects the end of the magnetic tape from the number of rotations of the drums on which the tape was wound and controls the starting and reversing positions of the tape; a head feed unit which slides the magnetic head along a guide shaft provided in the traverse direction of the tape thereby to form a plurality of tracks in the longitudinal direction of the tape; and a track selector unit which includes two sets of rotary switches which check the position of each track in synchronism with the magnetic tape feed to determine a desired track. Moreover, the embodiment of the present invention is equipped with a keyboard unit for track selection separated from the device proper which enables convenient and efficient operations.

The keyboard is provided with push buttons in the same number as that of the plurality of tracks and indicates the predetermined parties to be called. It is electrically connected with the track detector unit at the press of a button and each unit is energized successively on completion of track selection so that dial pulses are sent out to a telephone line from an electrical circuit block housed in the device proper. Incidentally, a telephone number can be recorded directly on the magnetic tape by operating a change-over switch in the electrical circuit block and by dialling it on a dial housed in the telephone.

The above and other objects, features and advantages will be made apparent by the detailed description taken in conjunction with the accompanying drawings, in which:

FIG. 12 is a plan of the magnetic tape unit;

FIG. 13 is a front view showing the section of the magnetic tape unit in the plane Z-Z as shown in FIG. 12;

FIG. 14 is a diagram showing a side view of the magnetic tape unit;

FIG. 15 is a diagram for explaining a tension gearing with a spring part provided between two rollers to give back tension to the magnetic tape;

FIG. 16 is a diagram for explaining said spring;

FIG. 17 is a diagram for explaining how the tension of the magnetic tape is adjusted;

FIG. 18 shows a front view of the device proper as shown in FIG. 1;

FIG. 19 is a diagram showing a side view of a track selecting means of the device proper;

FIG. 20 is a side view of a magnetic head holder;

FIG. 21 is a diagram showing a perspective view of dismantled head feeding means;

FIG. 22 is a plan showing a means for braking the head feeding means;

FIG. 23 is a cross-sectional view of the head feeding means;

FIG. 24 is a cross-sectional view of said braking means;

FIG. 25 is a plan showing a support of a timing belt of the head feeding means or a belt-tension adjusting means;

FIG. 26 is a rear view of the timing belt support;

FIG. 27 is a cross-sectional view of a track-selector unit;

FIG. 28 is a diagram for explaining the shape of the driving gearing as shown in the plane X—X of FIG. 27 which intermittently rotates a slider of the track selector unit;

FIG. 29 is a cross-sectional view of the driving gearing as shown in the plane Y—Y of FIG. 27;

FIGS. 30 and 31 are diagrams for explaining rotary switches for the track selector unit;

FIG. 32 is a perspective view showing the construction the track selector unit as it is dismantled;

FIG. 33 shows a side view of a recording-reproduction switching lever provided on the device proper;

FIG. 34 is a diagram showing a control panel of the device proper;

FIG. 35 is an outside view of a keyboard unit for operating the automatic dialling set according to the invention;

FIG. 36 is a diagram for explaining the operating principle of the keyboard;

FIG. 37 is a front view showing the construction of a push button on which a party to be called is indicated;

FIG. 38 is a cross-sectional view of the push button as shown in FIG. 37;

FIG. 39 is a plan showing the construction of the keyboard unit;

FIG. 40 is a front view of the keyboard unit;

FIG. 41 is a side view of the keyboard unit;

FIG. 42 is a cross-sectional view of the keyboard unit;

FIG. 43 is a diagram showing the operations of the switches of the keyboard unit;

FIG. 44 is a diagram for explaining the combinations of cross bars of the keyboard unit;

FIG. 45 is a front view showing another embodiment of the switch construction;

FIG. 46 is a cross-sectional view showing the embodiment of FIG. 45;

FIG. 47 is a diagram showing an electrical circuit of the track selector unit;

FIG. 48 is a block diagram showing the automatic dialling set according to the embodiment of FIG. 45;

FIG. 49, comprised of 49A–C, is a diagram showing the whole circuit of the automatic dialling set according to the same embodiment;

FIG. 50 is a chart showing waveforms for explaining the operations of the device according to the invention;

FIG. 51 is a diagram showing an embodiment of the automatic dialling set according to the present invention as it is actually operated; and FIG. 52 is a diagram showing the automatic dialling set according to the present invention as it is used in another way.

Figure 1:
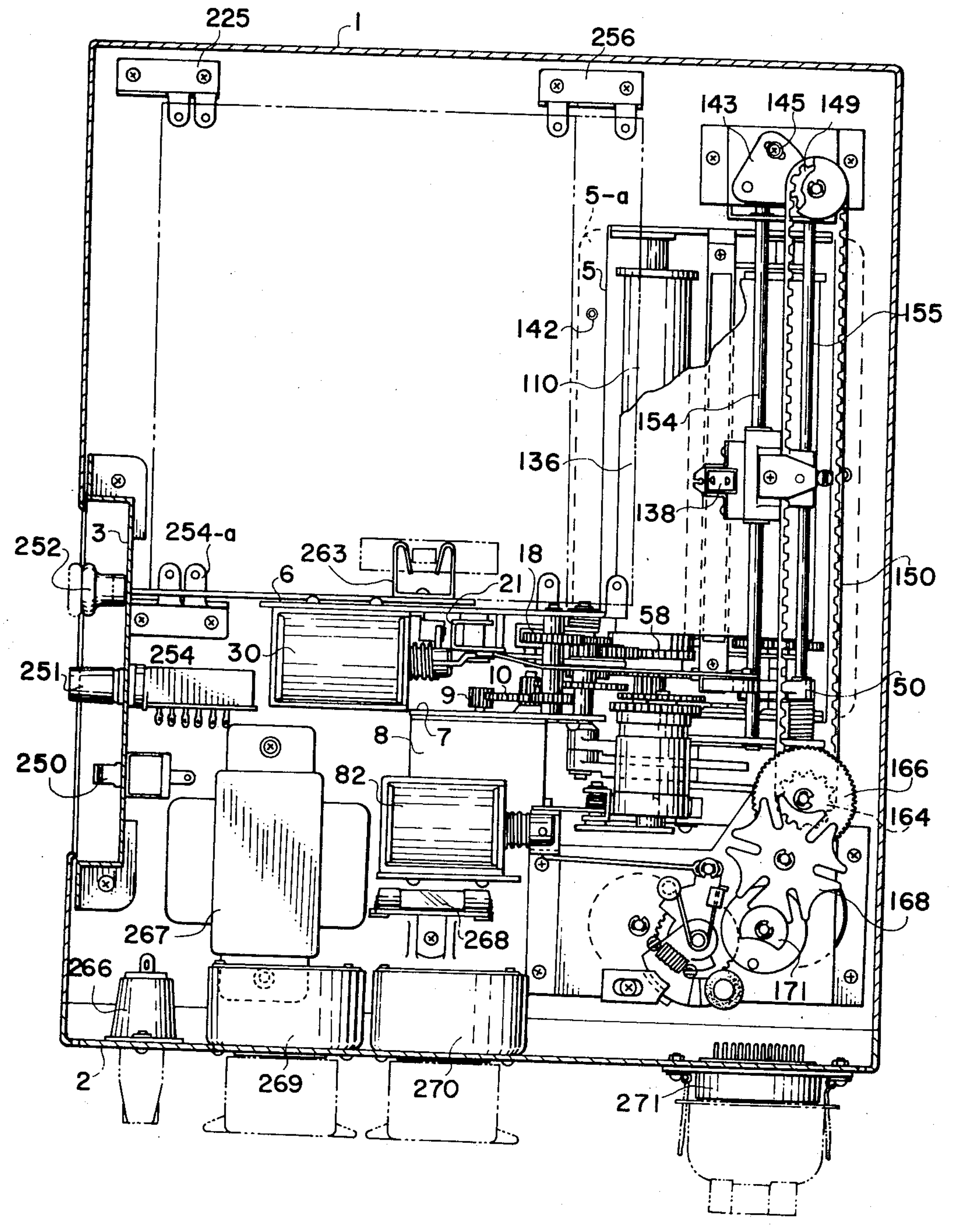
FIG. 1 is a diagram showing a plan of the device proper excepting a keyboard unit embodying the invention.
Figure 3:
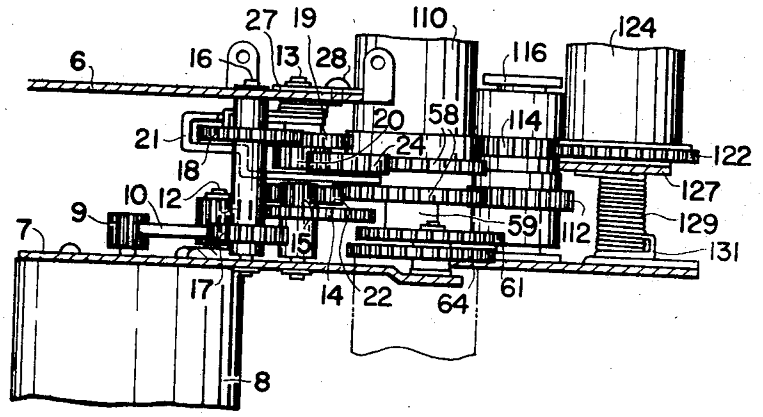
FIG. 3 shows a plan of said tape driving system.
Figure 2:
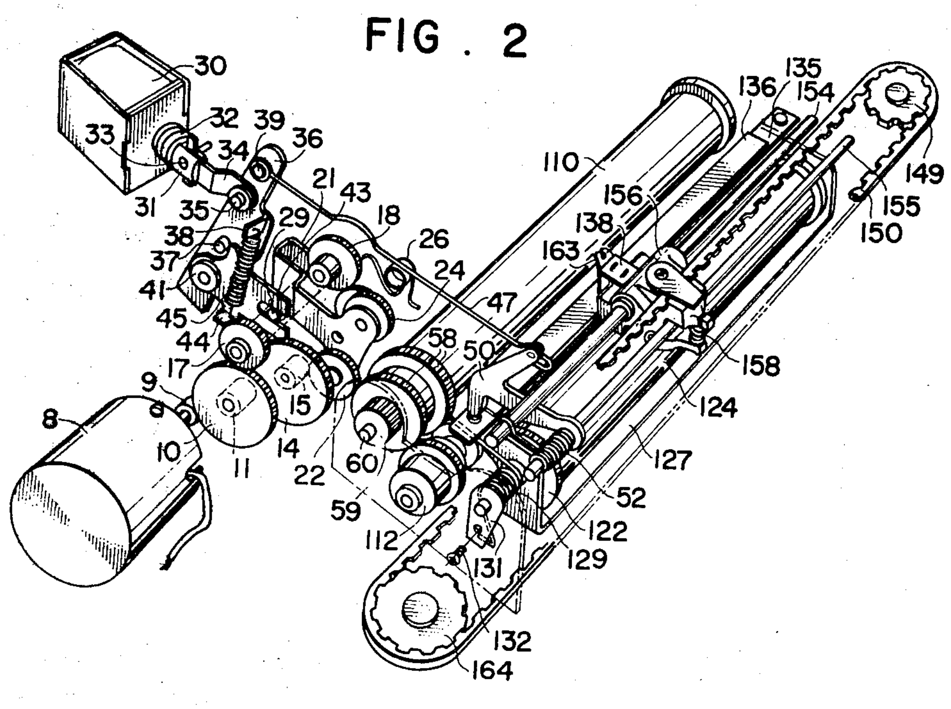
FIG. 2 is a perspective view of a magnetic tape unit and tape driving system.
Figure 4:
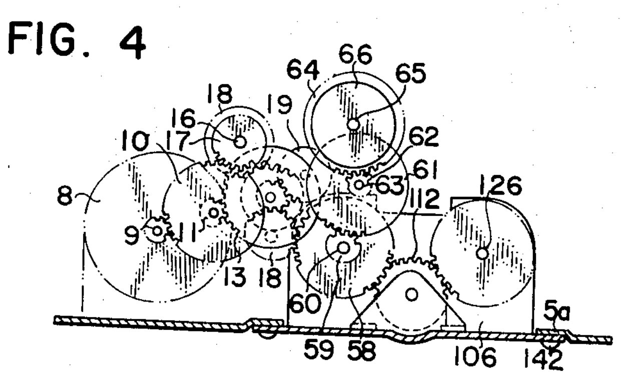
FIG. 4 is a diagram showing a side view of the gearing of said tape driving system.

As shown in FIG. 1, a housing of the device proper comprises a base plate 1, a side board 2 on which connectors for electrical circuits are mounted, a control panel 3 on which operating switches are mounted and a cover 4 for the device proper. The base plate is provided with rectangular hole 5 for mounting a magnetic tape unit from underside.

A tape driving unit will first be explained with reference to FIG. 1. At the center of the base plate are disposed side boards 6 and 7 at a certain distance from each other on which a series of reduction gears and a rotary switching means are mounted. Numeral 8 shows a DC motor which is fixed on the side board 7 by means of screws, and a motor pinion 9 drives a stepped gear, or an integration of a large gear 10 and a small gear 11, loose-fitted on a shaft 12 planted in the side board 7 in a second stage. As will be explained with reference to FIGS. 2 to 6, the small gear 11 of the stepped gear in turn drives another stepped gear, or an integration of a large gear 14 and small gear 15, in a third stage. On the other hand, the large gear 10 transmits the rotation of the motor pinion 9 directly to the integrated gears 17 and 18 loose-fitted in the shaft 16 which is supported between the side boards 6 and 7, while the gear 18 drives still another stepped gear which is an integration of a large gear 18 and a small gear 20. The two stepped gears, or the combinations of the gears 14 and 15 and gears 19 and 20 are mounted on the shaft 13 supported between the side boards 6 and 7, with a switching arm interposed therebetween. The switching arm 21 is fitted with idler gears 22 and 24 by means of caulked shafts 23 and 25, which are engaged with small gears 15 and 20 respectively. The switching arm 21 is floated about the shaft 13 and, as shown in FIG. 7, is energized by a helical spring 26 in such a direction that the idler gear 22 is always engaged with the gear 58 at the end of a magnetic tape drum. As to the gear 58, please see FIG. 12. Numeral 27 shows a plate for adjusting the pressure of the helical spring 26. One end of the helical spring 26 is hooked to the switching arm 21 while the other end thereof is hooked to the pressure-adjusting plate 27 which is adapted to float about the shaft 13 outside of the side board 6, so that adjustments are performed withing the range of a slot 29. To increase the spring pressure, for example, the pressure-adjusting plate 27 is rotated in the direction of the arrow shown in FIG. 7 and is fixed by means of the screw 28. Under this condition, rotation the motor pinion causes the two stepped gears or the two combinations of gears 14 and 15 and gears 19 and 20 to rotate in opposite directions on the same shaft 13, which in turn rotates the idler gears 22 and 24 in opposite directions.

Figure 5:
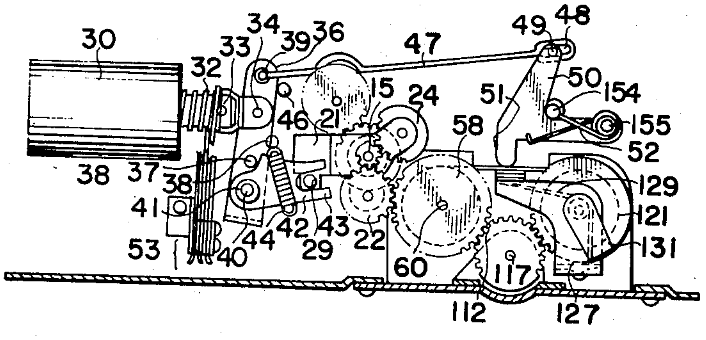
FIGS. 5 and 6 are diagrams for explaining the relations of operations between the magnetic tape unit and tape driving system.
Figure 6:
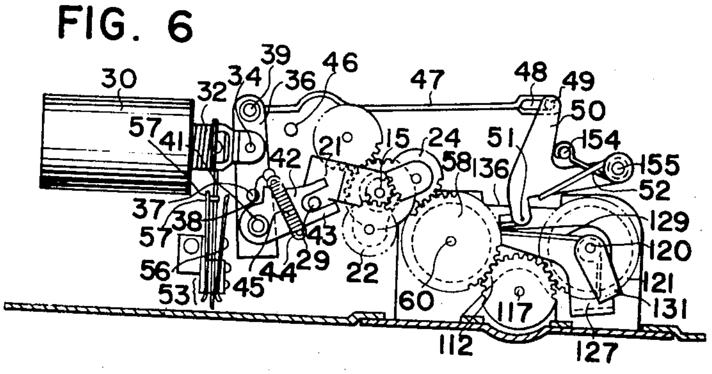
Figure 7:
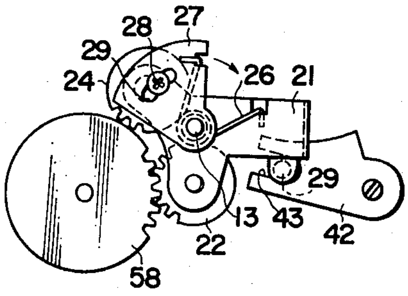
FIG. 7 is a partial view of the operations of an idler for switching the tape driving system between the forward and reverse directions.
Figure 8:
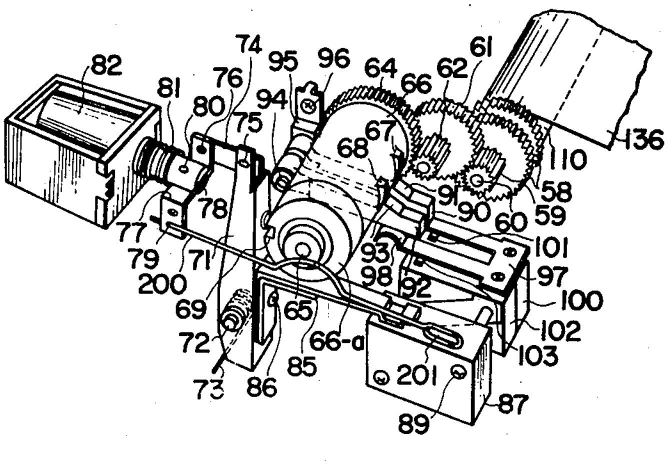
FIG. 8 is a perspective view of a cam unit for controlling the starting and reversing positions of the magnetic tape.

FIGS. 5 and 6 show the conditions of the device under which the magnetic tape is rotated in forward and reverse directions respectively. Numeral 32 shows a spring for restoring a plunger 31 to the original condition and which engages the plate 34 by means of a pin 33 with the plunger 31 of a DC solenoid screwed on the side board 6. The metal plate 34 is engaged with the lever 36 with an appropriate looseness, which is mounted, through a bush 41, movably on a shaft 40 planted in the side board 6. The shaft 40 is provided with an auxiliary lever 42 loose-fitted on the bush 41, whereby a fork 43 is engaged with a protruded pin 29 of said switching arm 21. Numeral 45 is a tension spring which is disposed between a bent piece 38 of the lever 36 and a bent piece 44 of the auxiliary lever 42 so as to hold up the auxiliary lever 42 to the position of the limit pin 37 with an initial tension higher than that of the helical spring 26 of the switching arm 21, and the purpose of provision of the tension spring 45 is to absorb the overstroke of the lever in switching the idler of the switching arm 21 as shown in FIG. 6.

When the DC solenoid 30 is energized, the plunger 31 causes the lever 36 to rotate about the shaft 40 in spite of the spring 32 and further causes the switching arm 21 to be pushed up through the auxiliary lever 42 with the result that the idler in contact with the outside of the gear of the magnetic tape drum is switched from the part 22 to part 24. Then the drum rotation is reversed for a reel-back operation at a small reduction ratio. Numeral 39 shows a pin for holding a connecting rod 47 which releases the pad for the magnetic tape and numeral 46 a stopper pin planted in the side board 6 for controlling a position to which the lever is returned. The other end of the connecting rod 47 is provided with a slot 48 which is engaged with the protrusion 49 of the arm 50 to apply pressure to the pad. The pad-pressing arm 50 is floated about an auxiliary guide shaft of the magnetic head which will be described later, and is connected with the guide shaft by means of the return spring 52. Therefore, under normal conditions, the pad-pressing arm 50 is held up to the position limited by the guide shaft as shown in FIG. 5, while the protrusion 51 of the arm 50 pushes down a pad arm of the magnetic tape unit against the tension of the spring 52 at the time of reversing the magnetic tape feed in the manner as shown in FIG. 6. Numeral 53 shows a spring switch which can be switched at the time of energization of the DC solenoid 30 while maintaining contact with a protrusion of the pin 33 coupling the plunger 31 and metal plate 34. Numeral 54 shows a plate spring with a common contact, one end of which is in contact with the coupling pin 33 through an insulation plate 55. Switching operations are such that the normally-closed contact 56 is closed when the DC solenoid is de-energized and the normally-open contact 57 is closed at the time of energization thereof. The spring switch 53 operates in such a manner that the normally-closed contact which supplies power to the electrical circuit block under normal conditions is opened at the time of rapid reversal of magnetic tape to protect the signals recorded on the magnetic tape from the influences of the magnetic head, while it is switched to the side of the normally-open contact for a self-maintaining the DC solenoid thereby to continue supplying power to it during the reverse feed of the magnetic tape.

Figure 9:
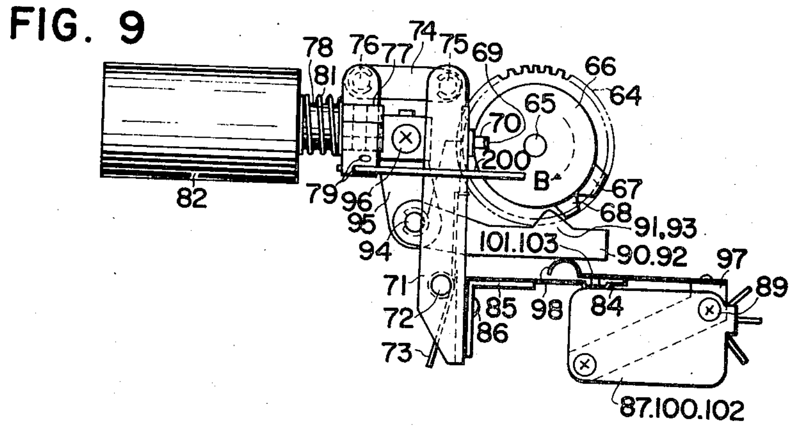
FIGS. 9, 10 and 11 are diagrams for explaining the operations of the cam unit.
Figure 10:
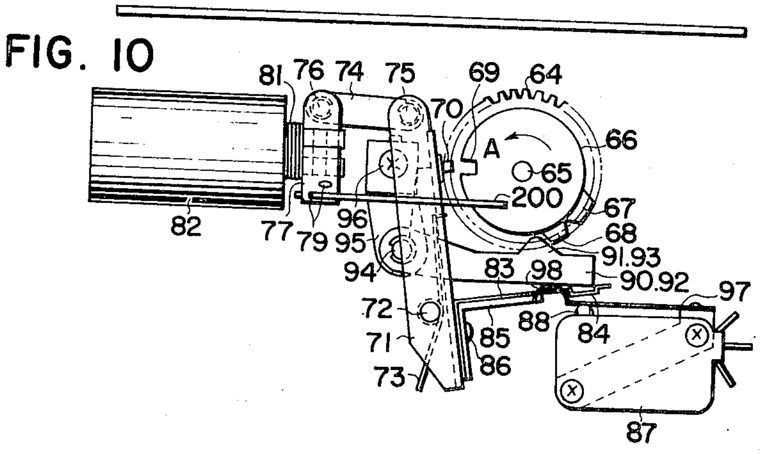
Figure 11:
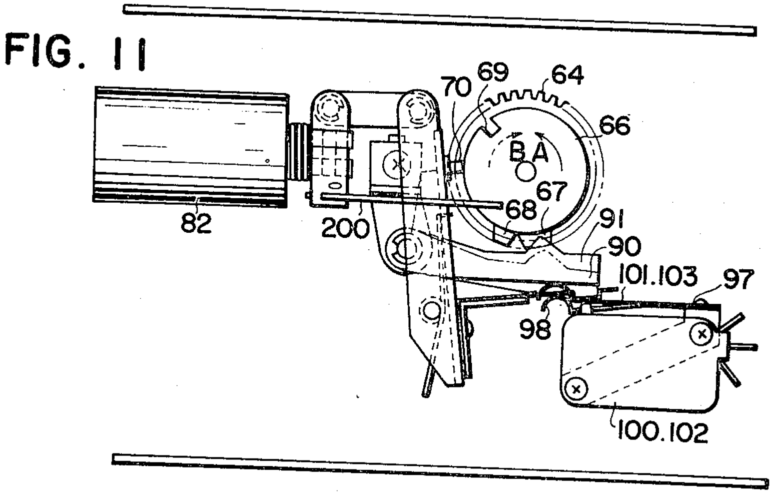

Explanation will be made now of the cam unit as shown in FIGS. 8 to 11 which controls the starting and reversing points of the magnetic tape. The magnetic tape is driven as the gear 58 of the magnetic tape drum is actuated, whereby a small-diameter gear integrally formed with the gear 58 drives the stepped gear comprising a large gear 61 and a small gear 62 which is loose-fitted on the shaft 63 planted on the side board 6, and then the gear 64 provided at the end of the cam 66 is actuated. (Numeral 60 shows a shaft of the magnetic tape drum which will be described later.) The cam 66 is mounted to float about on the shaft 65 planted on the side board 7 and is provided with protrusions 67 and 68 on its periphery, whereas at the end thereof is fixedly fitted a metal ring 67 with a groove 69. The local relationship among the protrusions 67 and 68 and groove 69 is as shown in FIGS. 9 to 11. A cam lock lever 71 which freely swings with the shaft 72 as a fulcrum is provided with a lock pin 70 projected toward the cam plate, and a helical spring 73, which is loose-fitted on the shaft 72 with its ends respectively engaged with the side board 7 and the lock lever 71, maintains the lock pin 70 of the lock lever 71 always in contact with the periphery of the metal ring 66-a and, when the groove 69 arrives in front thereof, gets engaged with it thereby to restrict the movement of the cam 66. On the other hand, an end of the lock lever 71 is connected with the plunger 78 of the DC solenoid 82 located on the side board 7, by means of a coupling metal 77 and link 74 which are in turn coupled with the pin 80. Numerals 75 and 76 show coupling pins of the link 74, numeral 81 a return spring for the plunger 78, and numeral 79 a slot for connecting a connecting rod 200, which actuates the brake of head feed and track selector units as described later. On the front side of the lock lever 71 is fitted a plate spring 83 by means of a keep plate 85 and a fastening screw 86, and the end 84 of the plate spring 83 depresses the button 88 of the main switch 87 among the microswitches 87, 100 and 102 disposed on the side board 6 one on another by means of a screw 89. Switch-operating arms 90 and 92 which are placed opposite to the protrusions 67 and 68 of the cam 66 are supported freely by the shaft 94 planted in the pedestal 95 fixed on the side board 6 by means of a screw 96, and said arms 90 and 92 are pushed up by a semi-circular portion 98 at the end of a forked actuator plate spring 97 which is riveted on the support plate 99 above the micro-switches 100 and 102, in such a manner that said arms are always in contact with the cam 66. The support plate 99, as shown in the drawings, is sandwiched and fixed by a screw between the micro-switches. When the cam 66 is rotated and the protrusion 67 or 68 touches the protrusion 91 or 93 respectively to push it down against the tension of the actuator plate spring, the button 101 or 103 of the micro-switch 100 or 102 is depressed.

FIG. 9 shows a condition in which the device is stopped because of the cam 66 being engaged. When the DC solenoid 82 is energized by a start signal, the plunger 78 moves the lock lever backward through the link 74 as shown in FIG. 10, so that the lock pin 70 comes off the groove 69 of the cam and at the same time releases the plate spring 83 which was depressing the button 88 of the operating switch 87 with a larger force than the righting moment of the button 88, thereby closing the operating switch 87. Then the DC motor of the tape driving unit is started and the tape begins to run, thereby rotating the cam 66 in the direction of the arrow A shown in FIG. 10. When the cam reaches the position as shown in FIG. 11, the protrusion 67 of the cam 66 gets in contact with the protrusion 91 of the operating arm 90, whereby the actuator 97 is bent at the side of the micro-switch 100 to depress the button 101. When the reversing micro-switch 100 is closed, said DC solenoid 30 is energized and the tape feed is reversed, thereby reversing the cam 66 as shown by arrow B. At the same time, the DC solenoid 82 is de-energized, that is to say, the DC solenoid is switched from the portion 80 to portion 82. The lock lever 72 is restored to the original position by the force of the helical spring 73, but the lock pin 70 slides along the periphery of the metal ring 67 of the cam 66 to the groove 69, where it returns to the condition as shown in FIG. 9 and the plate spring 83 of the lock lever 72 depresses the button 88 of the operating switch again, releasing the operating switch to stop the device. Now, referring to the operation of the micro-switch 102, if the DC solenoid is energized during the reversing action of the cam 66 for some reasons or in the absence of a start command, the lock pin 70 is retreated and hence cannot be engaged so that the cam 66 continues the reversing rotation and the groove 69 moves further in the direction shown by arrow B beyond the position indicated in FIG. 9. As a result, the protrusion 68 depresses the protrusion 93 of the operating arm 93 and thereby the actuator 97 is bent, pushing down the button 103. The micro-switch 102 is for switching from reverse to forward direction (depressing it opens the solenoid circuit because of a normally-open contact employed), by means of which the cam is rotated again in the direction of arrow A and the lock pin 70 is engaged with the groove 69 to stop the device. On the other hand, if a start command is issued subsequently to energize the DC solenoid 82, the device will be operated in the same manner as that of the initial starting operation. This makes it possible to control the starting position of the tape and hence a certain prepose can be made available prior to transmission of a recorded signal. (Transmission begins at a middle point of a recorded signal or without any pre-pose if the device switches to a forward tape feed before the completion of the reversing operation.)

The magnetic tape unit will be explained below with reference to FIGS. 12 to 17. The housing 106 is channel-shaped and two drums 110 and 124 which are supported by the shafts 60 and 125 respectively have magnetic tape of predetermined length attached at their ends. The magnetic tape is reeled up on the drum 124 under the normal conditions. (No detail of how to attach or bond the tape to the drum will be explained here because only a general rule is needed to be followed in attaching it.) In this embodiment, the effective tape length is about 76 cm and width 4 inches. (The detail will be explained later.)

Numeral 58 shows a driving gear integral with a small gear 59 as mentioned above. The driving gear 58 is divided by the groove 104 but it has no special meaning. Numeral 105 shows a collar of the drum 110 which is integrated with the driving gear 58. The two drums are of the same construction as shown in FIG. 13, in which a collar 122 of the same size as the gear 58 and a collar 123 are pressure-coupled respectively with the ends of the pipe 124*a* of light metal or plastic and they are coupled securely by means of pin 125. In the case of drum 110, the collars 105 and 109 correspond to the above-mentioned collars 122 and 123, and in both cases the distance between the respective two collars determines the 4-inch width of the magnetic tape 136.

The tape tension adjusting means or one of the features of the present invention will be described below. A gear 112 which is engaged with gear 58 is butted with a gear 114 engaged with a gear 122, and they are mounted on a shaft 117 supported by a plate 116 welded to the housing 106 as shown in FIG. 15. A coiled spring 118 as shown in FIG. 16 is inserted into the cylinder-shaped holes 113 and 115 of the gears 112 and 114 in a prescribed manner, while the ends 118*a* and 118*b* of the coiled spring 118 are inserted into the holes 119 and 120 cut in the bottom of the cylinder-shaped holes 113 and 115 respectively. In advance of mounting the magnetic tape 136, the gears 112 and 114 are rotated in opposite directions, that is to say, in this embodiment, one of the gears is turned 3 to 4 rotations (depending on the required tension of the tape) counterclockwise or in such a direction as to tighten the coil while the other gear is held immovable, and under this condition the gears 58 and 122 are made to engage with each other. Thus the forces in opposite directions as shown in arrows E and J are applied to the two drums to give tension to the magnetic tape 136 mounted on them. For example, when the drum gear 58 is driven in the direction of arrow E, back tension in the direction of J is always applied to the tape by the righting moment of the coiled spring 118. In FIGS. 15 to 17, the magnetic tape is at a starting position and collected on the drum 124, so that when the drum 110 is driven, the tape is fed in the direction of arrow E and the rotating force is transmitted from gear 58 to gear 112. On the other hand, the drum 124, in spite of the rotating force applied thereto in the direction of arrow J through the gears 114 and 121, is actually rotated in the direction of arrow I by the magnetic tape 136. Since the ends 118*a* and 118*b* of the coiled spring rotate in the same direction under this condition, the opposite rotating forces are still reserved in the coiled spring. Since more tape is collected on the drum 124 than on the drum 110 and therefore the drum 124 is larger in diameter than the drum 110, the speed of the drum 124 which corresponds to the amount of tape to be taken up by the drum 110 becomes lower, and the difference in speed between the two drums appears as the difference in speed between the gear 114 which falls behind and the gear 112, which difference is absorbed by the righting action of the coiled spring 118.

According as the difference in diameter between the drums becomes smaller, the delay of the gear 114 is reduced, and it almost disappears when the amount of tape on each drum becomes equal. Further, as more tape is transferred to the drum 110, the situation is reversed, that is to say, the amount of tape taken up on the drum 110 becomes larger than that released by the drum 124 and hence the drum 124 is increased in speed. As a consequence, the gear 114 tends to rotate again in such a direction as to tighten the coiled spring, which is finally restored to the original state with all the tape transferred to the drum 110. When reversing the tape feed or driving the gear 58 in the direction of arrow F, all the tape is taken up on the drum 124 by the righting moment of the coiled spring. In the process, it is needless to say that the magnetic tape keeps receiving back tension. That the above-mentioned means are very effective is proved by the fact that the relative difference in speed between the gears 112 and 114 are reduced very much. In this embodiment, the difference in rotational speed or, rather, the delay in angle is only 45° or thereabout. In other words, the difference in the tape feed which develops in one rotation between the drums with the respective diameters of R and R+$\alpha$ as shown in FIG. 17 is about $\pi\alpha$ and therefore the difference in rotational angle is $(360°\alpha)/(R+\alpha)$, which is about 32.7° if $\alpha$ and $R$ are 2 mm and 20 mm respectively, At the position of the coiled spring, the difference in rotational angle or the angle of torsion of the coiled spring is $D_1/d_2 \times (360°\alpha)/(R+\alpha)$, which is about 45.3° if the pitch circle diameters of the gears 58 and 121 respectively are 25 mm and those of the gears 112 and 114 are 18 mm. In this formula, $D_1$ and $D_2$ show pitch circle diameters of gears 58 and 112 respectively. This angular difference is maximum and, as described above, is reached again as the tape feed continues. Therefore, less burden is imposed on the coiled spring, its life is longer and its tension is more uniform, than the conventional coiled spring of this kind which has one end fixed outside of a drum and the other end hooked in the drum so that the coiled spring is wound up by the amount corresponding to the drum rotations. By contrast, this embodiment is so effective that the number of tape-winding rotations of the drum is about 12 or 13.

Another feature of the present invention is a pressure pad which improves the close contact between the magnetic tape and the magnetic head as shown in FIGS. 12 to 14. A pad arm 127 is mounted on the shaft 126 with the drum 124 interposed therebetween, numeral 128 showing a bush for a bearing of the pad arm 127. Further, a pad base 135 bonded with a felt pad 136 is fixed on the top of the arm 127 by means of screw 137. On the other hand, one end of the pad-pressing helical spring 129 wound around the spacer bush 130 with ample margin which positions horizontally the drum mounted in the housing 106 is hooked on the pad arm 134, while the other end thereof is hooked on the pressure-adjusting plate 131 between the housing 106 and the spacer bush 130 and through which the shaft 126 passes. The pressure-adjusting plate 131 is rotated along a sector slot opened to the housing 106 and, after adjusting the pressure of the helical spring 129, is fastened from outside later with a screw 132. Thus, the magnetic tape 136 is pushed up, applying appropriate pressure to the magnetic head 138, and combines with the function of the above-mentioned tape tension to improve the closeness of the contact. Incidentally, numerals 111 and 134, like 130 mentioned above, show spacer bushes for controlling the horizontal portion of the drum. Numeral 107 shows a shaft support mounted on the housing 106 which is embossed not to allow the shaft end to be projected from the side of the housing. Numeral 108 also shows an embossed portion in the bottom of the housing 106 to provide an escapement from the gears 112 and 114.

Now, operations of the above-mentioned component units will be described below. A start command which is issued on completion of track selection as described later causes the DC solenoid 82 to be energized, releasing the lockpin 70 from the cam 66 and at the same time starting the DC motor 8, and as a result the gears 9, 10, 11, 14 and 15 and also the drum gear 58 through the idler gear 22 are driven. In this embodiment, the motor revolutions are 2,200 rpm and reduction ratio 1/92, so that the magnetic tape feed is approximately 2.51 to 2.76 cm/sec if the outside diameter of the drum is 20 mm. The rotation of the cam 66 is further reduced to 1/13.5 of the rotational speed of drum 110. The protrusion 67 energies the micro-switch 100 after 12 revolutions of the drum or in about 30 seconds, and thereby the DC solenoid 30 is energized, whereby the idler 22 is switched to the side 24 or from forward to reverse feed. Then the DC solenoid is de-energized. At the time of reversal, the gear 58 is driven in the reverse direction through the pinion 9 of the DC motor 8 and the gears 10, 17, 18, 19 and 20. Since the reduction ratio is 1/8.3, the tape speed is about 28 cm/sec at the time of reversal, while the time required to reel back is 2.7 sec. For this reason, dial signals are produced within the 30-second period of forward feed, but even if the telephone circuit is connected for calling operations and speech, the tape feed is automatically reversed after 30 seconds and the tape regains the original position in about 2.7 seconds. However, it is needless to say that if impulse transmission is completed within 30 seconds as intended or a reset button (described later) is operated as required to correct erroneous dialling, tape feed reversal begins at a desired time before the lapse of 2.7 seconds, regaining the original tape position earlier.

The replacement of the magnetic tape unit is accomplished very conveniently by setting it in the embossed portion 5a from under the rectangular hole in the bottom plate 1 and screwed at the position of hole 140.

In the next place, explanation will be made of a head feeding unit which shifts a magnetic head at regular intervals in the axial direction of said head unit to form tracks 141 and improve the closeness of contact with the magnetic tape in cooperation with the head pad. Referring to FIGS. 18 to 26, the head guide shaft 154 and the auxiliary guide shaft 155 are laid in parallel with the magnetic tape supporting shafts 59 and 126 on the support blocks 143 and 151 on the base plate 1 as shown in FIGS. 1 and 18, and the head holder 156 is mounted slidably on the guide shaft. This embodiment employs a resin material with a high self-lubricating ability for the head holder 156, under which the tongue 157 is supported by the shaft 159 and the coiled spring 158 is provided between the end 157-*a* and the protrusion 156-*a* of the head holder 156 to hold the auxiliary guide shaft 155, thus achieving improved engagement between the two shafts and smooth sliding.

Numeral 150 shows a timing belt for head feed which is fitted into the dent 156-*b* of the holder 156 and the keep plate 160 is fixed from above by means of a screw 161. Numeral 162 shows a head-holding fitting which holds, with a screw 164, the magnetic head 138 fitted in the groove 156-*c* of the holder, at the same time supporting a lead wire (not shown) of the magnetic head by means of a slot 163.

One end of the timing belt 150 for head feed is supported by the tension-adjusting plate 144 in which a shaft 147 is loose-fitted in a timing pulley 149 on the guide shaft support 143 which is in turn mounted on the base plate 1 with the screw 153. The tension-adjusting plate 144 has a protruded pin 144-*a* and, with this as a fulcrum, is engaged with the support 143 so as to rotate it in the direction of the arrow shown in FIG. 25 along the slot 144-*b*, and fixed with the screw 146. Numeral 148 shows a circle plate mounted on the same shaft as the timing pulley 149 as its flange. Next, the pulley 166 on the driving side is supported by the housing 181 which is fixed in the base plate 1 with the screw 185 and has a head feed driving unit and a track selection unit on it. As shown in FIGS. 18, 19, 21 and 23, the timing pulley on the driving side is fitted movably on the shaft 167 which is planted in the housing 181, and the gear 166 disposed above is driven by the gear 169 of the follower 168 of the Geneva stop in the preceding stage. The Geneva stop which comprises the follower 168 supported on the shaft 170 and a driver 171 supported on the shaft 178 is a device, as is well known, in which the follower 168 makes one-sixth of a revolution until the pin 172 of the driver 171 enters and leaves the radial slot 168-*a* of the follower 168, while the circular portion 171-*a* of the driver 171 engages and is locked with the concave portion 168-*b* of the follower 168. An intermittent feeding mechanism of this kind stops the follower for a certain period of time and gives some allowance of the position at which the driver stops, so that the direction of motion of the pin which is about to enter the slot 168-*a* almost agrees with the center line of the slot, resulting in less shock. Also, in this embodiment, a buffer 173 is mounted on the same shaft as the driver 171 of the Geneva stop and is connected with a driving gear 177 underside a little elastically. The buffer 173 is provided with grooves 174 on both sides thereof and is engaged between the protruded portion of the driving gear 177 and that of the driver 171. In this way, the striking sound which results from the intermittent head feed by the Geneva stop has been remarkably reduced. A multiplicity of conventional intermittent motion means have a stop function but most of them has a disadvantage of a complex construction. Other intermittent notion means which are used in a track selection unit as described later employs a combination of notched gears, but their disadvantages include a large load, high speed and great impact and not recommendable from the viewpoint of their useful life and noises.

The driving gear 177 is driven by the pinion 179 of the head-driving DC motor 180 which is mounted on the housing 181 with the fixing band 182 and fixed thereon with a fastening screw 183 and which is projected from the opening 185 on the upper side of the housing 181. Further, the reduction gears 187 for driving the track selection unit (which will be described later) by means of the driving gear 177 is mounted on the shaft 186 planted in the stepped portion 188 of the housing 181. Also, as a braking means for the head feed unit, the bearing bush 193 is pushed into the operating lever 190 and the brake arm 192 is loose-fitted in the bush 193 and is mounted movably on said shaft 186 as shown in FIGS. 1, 21, 22 and 24. At the end of the brake arm 192 is fixed the flexible brake 195 such as wear-resistant rubber with the caulked pin 194 in such a manner as to be in contact with the periphery of the driving gear 177 and that of the driver 171 of the Geneva stop as required by braking operations. Between the cut-up portions 192-*a* and 190-*a* of the brake arm 192 and the operating arm respectively are inserted a coiled spring 196 for overstroke, which is inserted into a slot of the connector piece 77 of the DC solenoid 82 by engaging the slot 201 of the connecting rod 200 with the pin 199 protruded on the end of the operating lever. When the magnetic head comes to a preset track position, a command to start the magnetic tape is issued and for this reason the Dc solenoid 82 is energized as described above with reference to FIGS. 9 to 11, with the result that the cam 66 is released to pull the connecting rod 200 in the direction of the arrow shown in FIG. 22 and is rotated against the helical spring 197 with one of its ends wound on the bent portion 191 of the operating lever and the other end thereof on the post 198 which is planted in the housing 181 and doubles as a guide of the operating lever. The operating lever 192 causes the flexible portion 195 of the brake arm 192 to be pressed against the periphery of the driving gear and the driver of the Geneva stop through the coiled spring 196 for instantaneously stopping them, at the same time maintaining the locking function at the time of forward feed of the magnetic tape. FIG. 1 shows a condition in which the brake is released and FIG. 22 a condition in which the brake is applied to the protrusion 192-*b* of the brake arm 192 is in contact with the guide 202 of the brake arm 192 to control a rear position, the guide being fixed with an adjusting screw 203 through the slot 202-*a*.

The magnetic tape according to the present embodiment has 48 tracks, and is shifted by a track in one rotation of the driver 170 of the Geneva stop. (Track selection is completed within 2 seconds.)

Now the track selection unit which is interlocked with said head feeding unit to detect a designated track position will be described with reference to FIGS. 27 to 32 and 47. This unit comprises two sets of rotary switches mounted on the inside frames 212 and 213 in the housing 181 and which is energized synchronously by the gear 187 coupled to the head feeding unit. The gear 206 in mesh with the small gear 187-*a* of the gear 187, the disc 208 with a recess 208-*a* to receive the protrusion 206-*a* on the boss of the gear 206 and the gear 211 are arranged on a common shaft 207. The boss of the gear 206 has a sliding block 214 mounted with a screw 215 in such a manner that it slides along the insulation material 216 with fixed contacts 216-*a* and 216-*b* and fastened on the frame 21 with a rivet 222. The disc 208 which is disposed through the opening 216-*c* of the insulation material and the opening 212*a* of the frame and integrated with the gear 206, nd said disc has a dent 208-*b* while its periphery is in contact with a gear 209 loosed-fitted on the shaft 210 which is planted on the frame 212, as shown in FIG. 28. Notches of the gear 209 are provided on every other tooth and cover about half the length in the axial direction of the gear, so that they are engaged with the periphery of the disc to act as a lock of the notched gear 209. The notch 208-*b* which has the same shape as the notches of the gear 209 and is thicker than the disc is engaged with that portion of the gear 209 which is not notched, and thereby gives rotation by one pitch (which corresponds to the distance of two teeth in the case of the gear 209). In this embodiment, the notch gear 209 rotates one-third of a revolution for a turn of the disc 208. The intermittent motion mechanism of this kind is generally known. The notched gear 209 also engages with and drives the gear 211 which has at its boss a sliding block 217. The sliding block 217 slides along the insulation material 219 fixed on the frame 213 with the rivets 223 and on which are printed the fixed contacts 219-*a* and 219-*b*.

In this embodiment, the sliding blocks 214 and 217 constitute a twin, and on their slide-ways are welded contact pieces 214-*a* and 217-*a*. The fixed contacts are etched into a conductor pattern on an insulation substrate of resin and the surface of the fixed contacts are plated. The notched gear 209 which have six teeth is rotated by a pich for each turn of the disc 208. So, the gear 211 with 16 teeth makes one-eighth of a revolution, with the result that the sliding block also makes one-eight of a revolution for a turn of the sliding block 214.

The track selection means will now be explained with reference to FIGS. 30, 31 and 47. Numeral 224 of FIG. 47 shows a keyboard for selecting a party to be called which is described later, and it is so constructed that each pair of contacts arranged both breadthwise and lengthwise is connected at the same time for each push button. (Explanation is made with reference to FIGS. 35 to 44). The device according to the invention has six and seven push buttons arranged breadthwise and lengthwise respectively. For example, depressing a push button at row 2, column 3, in FIG. 47, a contact in row 2 is connected with a contact in column 3, which designates the position 248 as indicated by symbol ◌. Therefore, by closing the starting switch 225, the driving motor 180 starts rotating and feeds the head pitch by pitch while rotating the sliding blocks of the rotary switches 204 and 205. Each time the sliding block 214 transfers from terminal number 1 to 8 (or 8 to 1) of the fixed contact, the sliding block 217 is shifted by one number and soon reaches the positions of No. 3 of the rotary switch 204 and No. 2 of the rotary switch 205. Then the circuits (228-No.2, 205-No.2, 204-No. 3 and 227-No.3) are formed, thereby immediately stopping the feed. This will be described more in detail below.

When the sliding block is located at the position (A, 8) of the fixed contact, the magnetic head 138 is located, for example, at the left end of the tracks 141 as shown in FIG. 12. As the sliding blocks 217 and 214 rotate in the order of (1,1), (1,2), -(1,8), (2,1), - (6,8), (B,1), the magnetic head 138 is moved from left to right in the direction of arrow D track by track, as shown in FIG. 12. It is needless to say that the tape width, reduction ratio of the driving gear and the diameter of the timing plate 164 are so determined that when the sliding block reaches the combination (B,1), the magnetic head is located at the right end of the magnetic tape. Since the fixed contacts A and B of the rotary switch 205 are employed for detection of the edge of the magnetic tape, the magnetic tape has a total of 48 tracks on it. The function of a means for detecting an agreement between the track position designated by a push button on the keyboard and the head position is performed through the connection between the switches 227 and rotary switches 204 and 205. For convenience in understanding the 48 button positions, let us indicate the position in row *i* column *j* as (*i,j*). Then, as described above, the position indicated by symbol ◌ is expressed as (2,3).

One end of the switch 228 (1 to 6) is connected with the DC power supply terminal 226 through a starting switch 225. The other end of the switch 228 is connected with the fixed contact 219 of the rotary switch of the same number. One end of each member of the switch 227 is connected with the fixed contact 216 of the rotary switch 204 of the same number, while the other ends of the members are connected together to develop an output of the position detector circuit. Assuming that button (6,4) is depressed, a circuit between the switches is completed and a source voltage is produced at the output terminal when the sliding blocks 217 and 214 reach (6,4). (See FIG. 47).

A control circuit of a head-driving DC motor 180 will be explained now. A motor 180 is controlled by transistors 234 and 230, and at the depression of a push button, the starting switch 225 is closed to supply power. Then a base current flows in the transistor 230 through the resistor 231, which energizes the transistor 230, and a collector current flowing through the resistor 233 energizes the transistor 234, thereby rotating the motor 180. The resistor 349 constitutes a base resistor of the transistor 234. When the magnetic head reaches a designated track position or the keyboard switches agree with the rotary switch, a source voltage is produced at the output terminal and 56 is applied through the diode 229 to the base of transistor 230, thereby de-energizing the transistors 230 and 234 and stopping the motor 180. The solenoid 82, as already explained, secures a stop position by applying braking force to the selector means in cooperation with the Geneva stop. The diode 232 is for absorbing a back induced voltage.

Now, explanation will be made of the control of the rotational direction of the motor 180. The operation of the motor 180 is performed by switching the contacts 240*a* and 240*b* of relay 240, and the transistors 239 and 237 are for controlling the relay 240, while the diode 241 absorbs a back induced voltage. When the relay 240 is energized, the relay contacts 240*a* and 240*b* are connected with the N.O side to determine rotational direction so as to move the magnetic head 138 from left to right in the direction of arrow D of FIG. 12. In this case, a base current flows in the transistor 237 through the resistor 235, whereby the transistors 239 and 237 are energized to maintain the relay 240 energized. When the relay 240 is not in operation, the contacts 240*a* and 240*b* are connected with the N.C side and therefore a current in the reverse direction flows in the motor 180 for its reverse rotation thereby to move the magnetic head from right to left in the direction of arrow C as shown in FIG. 12. For detection of the side edges A and B of the magnetic tape, let us assume that the sliding blocks 217 and 214 have come to the combination (A,8). Then, if the base of transistor 237 is connected with the fixed contact 219-A through the resistor 236 and a junction point between the sliding blocks 217 and 214 is grounded through the resistor 247, a base current flows in the transistor 237, whereby the transistor 237 is energized to trigger the relay 240. As a consequence, the motor rotates in the reverse direction to move the magnetic head from left to right in the direction of arrow D as shown in FIG. 12.

Further, when this condition is changed and the right edge of the magnetic tape is reached with the sliding blocks 217 and 214 coming to the combination (B,1), the transistor 239 is de-energized, if the base of the transistors 239 is connected with the fixed contact 219-B of the rotary switch 205 and an appropriate resistor 247 is selected. As a result, the relay 240 is restored, causes the motor 180 to rotate in the reverse direction and the magnetic head moves from right to left in the direction of arrow C as shown in FIG. 12. This is because the resistance value of the resistor 238 is usually between 40 and 80 $k\Omega$, and if the resistance value of the resistor 247 is several hundred ohms and a d-c source voltage is 20V, the base voltage is about 0.2V which is sufficiently high to de-energize the transistor 239 on condition that it is a silicon transistor. The reason why the voltage is applied to the base of the transistor 239 through the switches 228-4, 228-5 and 228-6, resistors 244, 245 and 246 and capacitor 242 is to determine the direction in which the magnetic head moves — that is, the motor 180 rotates — in the initial stage of depressing a selected push button in order to shorten the track selection time. At this juncture, the tracks 141 on the magnetic tape 136 are divided into two groups, track group A which includes tracks (1,1) to (3,8) and track group B which includes (4,1) to (6,8). Then, when a track included in group A is designated by depressing a push button, the relay 240 is not energized thereby to start the movement of the head 138 from right to left in FIG. 12, and if there is the required track found until the tape edge A is reached, the head stops as mentioned before, but if not, the head movement is reversed at the edge A thereby to search for a corresponding track in group A. Also, when a push button is depressed to designate a track included in group B, one of the resistors 244, 245 and 246 is impressed with a source voltage through the switch 228 and a positive variation is applied to the base of the transistor 239 through the capacitor 242 to energize the transistor 239. As a result, the relay 240 is energized and the magnetic head 138 is moved from left to right in the direction of arrow D as shown in FIG. 12 to start a selecting operation in a similar manner as mentioned above. The resistor 243 is for discharging.

It will be understood from above that according to the invention a total of 48 tracks are divided into groups A and B and detection is made as to which group includes a desired track and thereby the direction in which the magnetic head 138 is to move is determined, which makes it possible contain the maximum distance of head movement within the width of the tape, providing a very efficient means for track selection.

The number of rotary switches (two in this embodiment) and how to arrange the fixed contacts (eight terminals by eight terminals in the embodiment) are determined by the arrangement of push buttons and the number of tracks on the magnetic tape. In this connection, other combinations are possible.

Explanation now will be made of the switch panel for use in this device, especially its arrangement within the device proper, with reference to FIGS. 33 and 34 and 1. Numeral 250 shows a power switch for the automatic dialling device and 251 a converter to decide on whether the device is connected to the telephone line to make the automatic dialling device for energization (AUTO) or the device is disconnected to connect only the telephone proper with the main wire (MANUAL). Numeral 252 shows a button for switching between recording and reproduction in recording on the magnetic tape impulses transmitted by the telephone. As shown in FIGS. 1 and 33, the knobs 260-*a* and 261-*b* of the slide switches 260 and 261 for switching the circuit between recording and reproduction which are fixed on the base plates 258 and 262 doubly by the support plates 254, 255, 256 and the side board 6 erected upright on the base plate 1 are made to engage fixedly with a square-shaped spring material 263 mounted on the slide plate 262 which is supported by a guide pin 264 fixed on said switching button 252, with slots 262-*a* and 262-*b* being provided in the bent portion 254-*a* of the support plate 254 of the base plate 259 and in the side board 6 respectively, thereby to perform pull or push operations. Numeral 4 in FIG. 33 shows a covering for the device. Numeral 265 shows a snap ring and numeral 253 an indication board fixed on the switch panel 3 and printed with character symbols. The electrical circuit is mainly housed in the two-layer insulation plates 258 and 259 and, as shown in FIG. 1, is screwed on the bent portions 254-*a*, 255-*a* and 256-*a* of the support plates 254, 255 and 256 respectively and on the bent portion 257 of the side board. The rest of the electrical components includes an a-c power connector 266, a power transformer 267, a power fuse 268, a connector 269 for connecting the telephone unit and the device, a connector 270 for connecting the device and the telephone line and a connector 271 for connecting the device and the keyboard.

The keyboard comprises push buttons and reset buttons in a number corresponding to the memory capacity, and by depressing push buttons corresponding to an intended called party, instead of dially, the track selecting operation and the series of magnetic tape operations as described above are performed and the related electrical circuits are energized, so that impulses corresponding to the particular telephone number stored in the magnetic tape are transmitted over the telephone line. Details will be explained below with reference to an embodiment. According to the embodiment, the keyboard unit is separated from the device proper for convenience of use on a desk, but it is built in the device proper in most cases. FIG. 35 shows an outside view of the keyboard, in which numerals 272 and 273 respectively show upper and lower parts of a housing, and numeral 274 a speaker for voice response through which the response from the called party can be heard without taking up a receiver at the time of auto-dialling, the only requirement being to take up the receiver subsequently for speech. This method is well known and will not be explained in detail. Numeral 275 shows an window of indication lamps which indicate operations of the device, switchings between recording and reproduction, the device being dialled and completion of recording operations. Numeral 276 shows push buttons for dialling for transmission with parties to be called indicated thereon. Numeral 277 shows a reset button which cancels operations in the case of misdialling or when the line is busy, whereby the main wire is opened immediately, the magnetic tape feed is reversed and the wrongly locked buttons released.

The basic construction of the keyboard unit which is one of the features of the invention will be explained below with reference to FIG. 36. As explained earlier in connection with the track selection unit, the keyboard is indicated by the portion in FIG. 47 which is surrounded by a chain and has two switch groups 227 and 228. For example, at the press of button 276-9 of group 276, the button bar 282-9 pushes down the tongues 283 and 284 provided on the two shafts 278-1 and 280-2 respectively which are crossed with each other, and thereby rotates the shafts 278-1 and 280-2 in the directions shown by arrows. The crossed shafts 278-1 to 278-8 and 280-1 to 280-6 are provided with cams 279-1 to 279-8 and 281-1 to 281-6 respectively which are placed opposite to switches 227-1 to 227-8 and 228-1 to 228-6 respectively, and when the shaft 278-1 rotates, for example, the cam 279-1 turns the switch 227-1 "ON", while the rotation of shaft 280-2 causes the cam 281-2 to turn the switch 228-2 "ON". So, as shown in the circuit diagram of FIG. 47, one switch is selected from each of the groups 227 and 228 and this switch combination forms a circuit. As another example, depression of the push button 276-1 causes the rotation of shafts 278-1 and 280-1 and then the switches 279-1 and 228-1 are closed, forming a different switch combination. In other words, as the push button 276-9 is depressed in the circuit diagram of FIG. 47, search for a track position is conducted when the sliding blocks of the rotary switches 205 and 204 reach terminals No. 2 and No. 1 respectively. Then, depression of the button 276-1 causes a circuit to be formed for search of the next track position when the sliding block of the rotary switch 205 is positioned at the terminal No. 1 and the sliding block of the rotary switch 204 makes another turn to reach the position of terminal No. 1. (This operation was already explained in connection with the track selection unit described above.)

Other cams 285-1 to 285-6 are provided on the other ends of the lengthwise shafts 280-1 to 280-6, which engage with the protrusion 287 of the slide plate 286 and moves lengthwise with the rotation of shafts 280-1 to 280-6 thereby to energize the micro-switch 225 through the actuator 288 made of a plate spring. The micro-switch 225, as shown in FIG. 47, is for supplying power to the circuit and is closed at the depression of any of the push buttons.

Explanation will be made now of an embodiment. FIGS. 37 and 38 show the construction of a push button, in which, as is generally known, the push button bar 280 is pressed into the push button material 276 and the transparent cap 289 of resin mold is covered on it with a card 290 indicating a called party disposed on the top of the push button material 276. The transparent cap 289 has a protrusion 289-*a* which is set at the recess 276-*b* of the push button material 276 for insertion against the elastic force of the transparent cap 289 thereby to fit it in the recess 276-*a*. This permits a simple holding of the cap 289. The keyboard unit, as shown in FIGS. 39 to 44, has the frame 294 and two support plates 295 and 296 placed on the side boards 292 and 293 with their ends fastened to the upper plate 291 and framed with a screw. The upper plate has holes 291-*a* arranged in six lines both breadthwise and lengthwise, which in cooperation with the holes 293-*b* hold the push button bars 282. Between the long side 282-*b* of the push button shaft 282 and the frame 293 is inserted a conical spring 297 to give the upward righting power to the push button 276. A roller 298 to support a locking plate 3 is mounted on the inside of the side wall of the frame 294 by means of the shaft 299. The locking plate 300 is ladder-shaped with each rung limited by the lower end of the slanted protrusion 282-*a* of the push button bar 282. Further, an end of the locking plate 300 is projected through the opening 292-*a* of the side board 292 and forms a protrusion with a slot 301 which engages with the trigger 304 fixed with a pin 305 on the plunger 306 of the d-c solenoid 307 on the support frame 308 which is in turn screwed on the upper plate 291. On the other hand, the coiled spring 303 is laid between the cut-up portion 302 of the locking plate and the upright portion 294-*b* so that the locking plate is always pulled leftward in FIG. 40. Between the side boards 292 and 293 and between the support plates 295 and 296 are laid the lengthwise shafts 280-1 to 280-6 and breadthwise shafts 278-1 to 278-8 which are crossed with one another as shown in FIG. 44 in such a manner that the tongues 283 and 284 are positioned below the push button bar 282. Needless to say, the lengthwise shaft 280 and breadthwise shaft 278 are both supported rotatably. At the side of each shaft through which a support plate is pierced, a snap ring 315 is fitted and the cam 281 is mounted. Further, the cam 281 is held fixedly between the washer 319 and the snap ring 315 with the screw 318. The coiled spring 316 is laid at this time between the cam 281 and the pin 317 protruded from the support plate 296 or side board 293 in the manner as shown in FIGS. 43 and 44 with the cam 281 held at the position limited by the pin 317. The switch 227 as shown in FIG. 43 is an example in which a spring switch is employed, and as is well known comprises the springs 321 and 322 which are held by a support 324 screwed on the frame 294, through insulation material. Numeral 320 shows an insulation plate which is attached on the spring 321 and faces the cam 281 and numeral 323 a stopper for limiting the return movement of the spring 321 at the time of de-energization.

In FIGS. 40 and 41, the lengthwise shafts 208-1 to 280-6 are fitted with the cams 285-1 to 285-6 as mentioned before, which engage with the protrusions 287 of the slide plate 286 placed between the metal support 326 and the bent portion 327 of the side board 292 in parallel with the side board 292. Then the actuator 288 of the micro-switch 225 screwed on the support plate 328 which is in turn fixed on the side board 292 with the screw 329 is depressed for a switching operation. Numeral 277 in FIG. 40 shows a reset button which can operate the two micro-switches 312 and 313 fixed on the frame 309 with the screw 314 by means of the plate 310-*b*, the conical spring 311 being mounted between the support frame 308 and the protrusion 310-*a* of the reset button bar 310 supported by the upper plate 291 and the support frame 308. Numeral 331 in FIGS. 39 and 41 shows a support plate for the indication lamps 334, 335 and 336 which is screwed on the upper plate 291 and the lamps are held by the spring 332 fixed on the support plate with a rivet 337. Each of the indication lamps for indicating various operating conditions and it is needless to say they are located at the positions corresponding to the windows 275.

Now referring to the operations, when one of the buttons as shown in FIG. 40 is pushed down against the coiled spring 297, the slanted protrusion 282-*a* of the push button bar lowers to the position indicated by a broken line whereby the locking plate 300 moves rightward along the slope, and by pushing down further the button, the slanted protrusion 282-*a* comes below the locking plate 300, which is thereby pulled back to the original position by the spring 303, thus locking the button 276-45 as shown in the drawing. At this time, the push button bar 282 rotates both the lengthwise and breadthwise shafts and, as shown above, selectively energizes each switch through a cam. In the next place, when the magnetic tape enters into reversing feed, that is to say, when transmission of all the dialling signals is completed, the d-c solenoid 307 is temporarily energized by electrical signals and the locking plate 300 is pulled in the right direction by the attracting power of the plunger thereby releasing the push button. Also, the locked button may be released by depressing the reset button 277, which closes the micro-switches 312 and 313 to cut off the device from the main wire while at the same time temporarily energizing the d-c solenoid 307.

FIGS. 45 and 46 show another improved embodiment with switches arranged both lengthwise and breadthwise. An insulation material 339 on which a conductor is printed is attached on the shaft support plate 338 corresponding to the side board 293 and support plate 296 and an insulation material 341 is fixed with a pin 345 at the end of a cross bar 340 which is placed through the insulation material 339. The slide block 342 made of a plate spring is attached on the insulation material 341 with a rivet 344 and the end of the slide block 342 is welded with a contact 343. Because of the coiled spring 346 similar to the coiled spring 316 mentioned with reference to the foregoing embodiment, rotation of a shaft at the press of a button causes the rotation of the slide block 342. Then the portion 342-*a* of the arm is brought into contact with each of the lead terminals 347-*a*, 347-*b*, . . . which makes possible a similar switching operation as in the foregoing embodiment since the other portion 342-*b* of the arm is always above a common terminal 348. (This common terminal 348 corresponds to a common line of the switch groups 227 and 228 of the keyboard circuit 224 as shown in FIG. 48.) The features of this embodiment, as compared with the foregoing embodiment, are that less space is needed for the switches, that lead wires are connected easier since the lead terminals can be collected at an end as shown in FIGS. 30 to 31, and that there is nothing against nature in the construction of this improved embodiment with more stable switching operations compared with the foregoing embodiment in which the plate spring is directly pressed.

The automatic dialling set of the present embodiment will now be explained from the viewpoint of its circuit arrangement with reference to FIG. 48. The power supply of the device comprises an a-c power plug 266, a power switch 250, a power fuse 268 and a power circuit 351, from which a voltage of d-c 12 volts is applied to individual blocks. As described before, the device is operated at the mere depression of a button on the keyboard 224 corresponding to a party to be called. Each switch group on the keyboard 224 is connected with a head position detector circuit 354 of the device proper by means of line 352, the portion 353 of which, as explained with reference to FIG. 47, is connected with a head motor control circuit 355 to determine the direction of head movement or the rotational direction of the head driving motor 180. Thus the track selection means 356 including a d-c motor 180 is energized. Depression of any button on the keyboard 224 causes the main switch 225 to be closed thereby to supply power to the head motor control circuit 355 and to the magnetic tape control circuit 357 through the line 370. (Although not shown in the drawing, the power supply is also connected with each of the recording and reproduction circuits.) The track selection means 356, as shown in the broken line, is so constructed that it is connected with two sets of rotary switches 204 and 205 as shown in FIG. 47 included in said position detector circuit 354 and the magnetic head 138. When the position detector circuit 354 including the rotary switches 204 and 205 and the switches on the keyboard 224 detect a desired position, a corresponding signal is produced through the line 358 and a stop signal is given to the head motor control circuit 355, thereby stopping the head driving motor 180 and at the same time energizing the d-c solenoid 82. The DC solenoid 82 causes the track selection means to be braked and the lock lever 71 to be taken off out of the notch 69 of the cam 66 in the cam unit as described before with reference to FIGS. 8 to 11, and thus the switch 87 is closed for actuating the magnetic tape control circuit 357.

The magnetic tape control circuit 357 is for controlling the DC solenoid 30 to switch to the reverse feed the tape driving motor 8 included in the tape driving means 360 and the tape driving means 360, and it receives a start signal also by way of the main switch 225 on the keyboard 224 through the line 370 but only by the agency of a 3-second timer included in the circuit 357 to prevent it from being actuated even if the track selection is completed within that time. Further, the tape driving means 360 is not actuated even after the lapse of 3 seconds if the track selection is not completed the above description is in connection with the transmission of impulses, and, at the time of recording, the time limit of the 3-second timer is changed to about 15 seconds after the opening of the operating switch 87. Through these operations or by means of the impulse detector circuit of the main line control circuit 371, a taking up of a handset is detected with an earlier signal of them energizing the tape driving means 360. The time limit of 3 seconds is provided taking into consideration the sufficiently long time required for the device to catch the telephone line completely in transmitting dialled impulses, while the prolonged time limit of 15 seconds at the time of recording is set on the assumption that a handset is taken up and dialled with 15 seconds of the starting of the device. If such operations are not completed within 15 seconds, the magnetic tape is automatically fed.

Then, the tape drums 110 and 124 are rotated to feed the tape 136 and recorded impulses are reproduced by the magnetic head 138, transmitting dial impulses to the telephone line from the impulse transmitting circuit 363 through the amplifier circuit 361 and the switching circuit 362. When the desired party to be called is connected, the telephone 364 is available for speech. By the way, the speaker circuit 368 is such that the called party's response, if any, after dialling transmission is converted into an answering voice to be produced by the speaker 369, and so the answering voice may be confirmed before taking up the handset of the telephone for speech.

On the other hand, when a tape end is reached, the cam 67 of the cam unit causes the reversing switch 100 to be closed and the DC solenoid 30 is energized, so that the tape driving means 360 is switched to the reverse motion while at the same time closing the self-maintaining switch 53 of the DC solenoid 30. This is because the reversing switch 100 is not continuously maintained due to the reversal of the cam unit.

At the time of recording, a little time lag (about several hundred milliseconds) is provided by the magnetic tape control circuit 357 from the closing of the reversing switch 100 to the energization of DC solenoid 30. This is because a longer recording area than a reproducing area on the magnetic tape 136 prevents generation of a false pulse which otherwise might be caused near the tape edge due to the disagreement in the edge of the magnetized areas in the longitudinal direction of the magnetic tape.

When the magnetic tape 136 returns to the original point, the lock lever 71 for operating the operating switch 87 returns to the cam notch 69. As a result, the operating switch 87 is opened and the DC solenoid 30 is de-energized, thereby completing all the operations including the other circuits. The returning to the original position of a push button on the keyboard 224 is accomplished by controlling the DC solenoid 307 through the line 365. When it is needed to cancel the line during a dialling operation or due to a misdialling, the reset button 227 is depressed to send a cancellation signal through the main wire control circuit 371 and line 366 by means of the switches 312 and 313 while the tape-reversing solenoid 30 and the solenoid 307 for restoring the push button to the original condition are energized by being connected with a power supply for an immediate restoration.

As to the operations of recording a telephone number, the recording-reproduction switches 260 and 261 are operated, a push button corresponding to desired information is depressed, as in the case of reproduction, for track selection and then the tape is fed continuously, so that, by dialling the telephone 364, dial signals are recorded on the magnetic tape 136 by means of the magnetic head 138 through the recording circuit 367. Incidentally, the telephone line control circuit 371 comprises a circuit for switching the telephone 364 from main wire 270 to a d-c power supply, a circuit for detecting a contact signal of the telephone, a telephone-line-holding circuit provided in case the telephone 364 has not caught the telephone line, and a timing circuit. As can be seen from the above description, this device is very convenient in that dial impulses are recorded directly from a telephone supplied together with the device. Thus a desired dial number is recorded as the tape is being fed. The switch 102, as already explained in connection with the cam unit, is provided for the purpose of preventing the tape from being overrun at the time of reversal, and unless the cam is caught at the position of notch 69, the cam protrusion 68 cuts off the switch 102, thereby immediately de-energizing the d-c solenoid 30 and regaining the forward feed or the rotation toward the notch 69.

If there is a call from outside at the time of recording when the telephone is occupied, the speaker 369 produces a ringing tone through the speaker circuit 368, and therefore the converters 251-*a* and 251-*b* are switched to the side M, thereby connecting the telephone line 270 and telephone 364 directly with other. Then it suffices to make an answer with the telephone 364.

Now the device of the present invention will be explained in detailed with reference to the circuit diagram of FIG. 49 based the block diagram of FIG. 48.

Prior to the explanation of the circuit diagram, numerals indicating main electrical components are listed below as compared with corresponding component numerals.

Switch S1 in FIG. 49*c* corresponds to numeral 250 in FIG. 48,
Switch S2 in FIG. 49*b* to numeral 225 in FIG. 48,
Switch S3 in FIG. 49*b* to numeral 228 in FIG. $&,
Switch S4 in FIG. 49*b* to numeral 227 in FIG. 47,
Switch S5 in FIG. 49*b* to numeral 204 in FIG. 47,
Switch S6 in FIG. 49*b* to numeral 205 in FIG. $&,
Switch S7 in FIG. 49 to numeral 87 in FIG. 48,
Switch S8 in FIG. 49*c* to numeral 100 in FIG. 48,
Switch S9 in FIG. 49*c* to numeral 53 in FIG. 48,
Switch S10 in FIG. 49*c* to numeral 313 in FIG. 48,
Switch S11 in FIG. 49 to numeral 312 in FIG. 48,
Switch S12 in FIG. 49*c* to numeral 102 in FIG. 48,
Relay RY7 to numeral 240 in FIG. 47,
Contact *ry*7-1 to numeral 240-*a* in FIG. 47, Contact $ry$7-2 to numeral 240-*b* in FIG. 47,
Transistor Q23 to numeral 239 in FIG. 47,
Transistor Q24 to numeral 237 in FIG. 47,
Transistor Q25 to numeral 234 in FIG. 47,
Transistor Q26 to numeral 230 in FIG. 47,
Diode D19 to numeral 229 in FIG. 47,
Transformer TR1 to numeral 267 in FIG. 1.

SA1 to SA11 show interlocked switches for changeover between recording and reproduction which comprise the slide switches 260 and 261 in FIG. 33 and, under the condition as shown, are connected with the reproduction side. SB1 to SB4 show converters which either cut off the device proper from or connects it with the telephone line, the drawing showing the state in which the telephone line is connected with the device proper. (This corresponds to 251-*a* and 251-*b* in FIG. 48.) P1 and P1'p3' show terminals for connecting the telephone line and corresponds to the terminal 270 in FIG. 48, P2 and P2' showing terminals for connecting the telephone 364. The following abbreviations are employed here for convenience of reference to component elements of the telephone 364; i.e. hook switch HS, dial impulse switch D*i*, shunt switch SH and d-c internal resistance RT of the telephone. P3 and P3+ which show terminals for connection to a power supply correspond to the power plug 266 in FIG. 48, and supply power to the primary of the power transformer TR1 (corresponding to 267 in FIG. 1) through the power switch S1 (corresponding to numeral 250 in FIG. 48) and fuse 268. A DC power supply is obtained by smoothing the secondary output of the power transformer TR1 by means of capacitor C1 after rectifying it with the diodes D1 and D2, the power circuit 351 comprising the power transformer TR1, diodes D1 and D2 and capacitor C1. It is needless to say that when the device is in operation, the power switch S1 is closed. Numeral 138 shows a recording-reproducing magnetic head, and dial impulses are recorded on or reproduced from the magnetic tape 136.

Explanation will now be made of the amplifier section 361, which comprises integrated circuitry Q1 for two-state amplification and transistor Q2 and amplifies the output of the magnetic head 138 to such a degree as to drive the next stage. In the integrated circuitry Q1, numeral 4 shows an input terminal, numeral 7 an output terminal and numerals 2 and 8 power terminals. The capacitors C2 to C4 are for blocking a DC portion, while the capacitor 6 connected with the terminal 3 is a bypass capacitor. The resistor R2 in parallel with the capacitor C7 to obtain a desired input impedance, while the resistor R1 and the capacitor C5 inserted between the output terminal 7 and the terminal 5 are for obtaining a desired gain and frequency characteristic by negative feed back. The resistor R3 and capacitor C8 are for decoupling.

The switching amplifier section 362 not only performs a switching amplification by means of the transistors Q3 and Q4 but separates the polarity of the reproduced signals after amplification so that the impulse transmission section 363 in the next stage may be actuated. At the same time, the output of the transistor Q4 is reversed by the transistor Q5 to make the output polarity of the transistors Q3 and Q5 to agree with each other. These outputs are differentiated through the capacitors C9, C10, resistors R4 and R5 and diodes D3 and D4 thereby to trigger an R-S type flip-flop comprising the transistors Q6 and Q7 at a fall point of the input. The impulse transmission section 263 comprises a flip-flop, an impulse relay, a shunt relay and a circuit for actuating these relays. The bases of the transistors Q6 and Q7 are supplied with a reverse bias by means of the resistor R6 and capacitor C11 in this flip-flop.

The transistor Q8 is provided for the purpose of resetting the flip-flop and is biased in the reverse direction when the transistor Q21 is energized after the tape-driving motor 8 is started. For this reason, the transistor Q8 is energized for the time constant determined by the resistors R7 and R8 and capacitor C12, thereby forcibly energizing the transistor Q7 of the flip-flop and locking it in that state. However, on completion of the charging of the capacitor C12, the transistor Q8 is de-energized and therefore the outputs of the transistors Q3 and Q5 in a position to trigger the flip-flop. The diode D30 is used for blocking a reverse current.

The output of the transistor Q7 of the flip-flop is applied through the transistor Q9 or buffer amplifier to the transistor Q11 to energize the impulse relay RY1 thereby transmit impulses to the main wire on behalf of the telephone (see FIG. 50). The output of the transistor Q6, on the other hand, is applied through the transistor Q10 or buffer amplifier and a delay circuit comprising the resistor R10 and capacitor C13 to the transistor Q12 to energize the shunt relay RY2 (See FIG. 50, W18), thus shunting, on behalf of the shunt switch SH, a click intruding into the telephone 364 or speaker circuit 368 during transmission of impulses. The resistor R20 is for shunting and the noises temporarily caused during impulse transmission are absorbed by the capacitor C22 and the varistor D14. The resistor R22 and capacitor C23 connected in parallel to the impulse contact ry1 is for protecting the contact. Also, power is supplied to the flip-flop of the impulse transmission section 363, amplifier circuit 361 and switching amplifier circuit 262 through a constant voltage circuit comprising the transistor Q13, diode D25, resistor R11 and capacitor C14, thus improving the reliability of the device.

The telephone line control circuit will be explained now. As already explained with reference to the block diagram of FIG. 48, this circuit comprises a switching circuit for the telephone 364, a circuit for detecting dial impulses (detection of the opening and closing of the impulse switch D2 and hook switch HS of the telephone 364), a circuit for catching the main wire and a 2-minute timer. Each of these components will be explained below.

The safety relay RY4 employs a reed relay for the impulse relay RY1 and therefore it is necessary to maintain the contact ry1 closed by energizing its relay coil even when the device is not in operation. So, it is connected in parallel with the contact ry1 as shown in FIG. 49 to de-energize the impulse relay RY1 when the device is out of operation, and also to prevent the disconnection between the main wires P1 and P1' and the telephone 364 even at the time of power failure.

At the time of reproduction, a variation of voltage is applied to the base of transistor Q15 through the capacitor C16 and resistor R13 when the switch S7 for detecting a start point is closed. Thus the transistor Q15 is energized and the relay RY4 is actuated thereby to be self-maintained by the contact *ry*4-2. De-energization of the relay RY4 is performed when the power supply is stopped by opening the switch S9 and the starting-point detecting switch S7 which is energized at the time of energization of the reversing solenoid 227.

The 2-minute timer is provided to prevent the main wire from being caught for a long time when impulses are transmitted as a result of an erroneous start of the device. The time limit T3 in this case is set at about 2 minutes. This 2-minute timer comprises a power supply section having the relay RY3 and transistor Q14 and a timing section having the transistors Q17 and Q18. As a push button on the keyboard 224 is depressed, a voltage variation caused by the resultant closing of the main switch S2 is applied through the capacitor C15 and resistor R12 to the base of transistor Q14 thereby to energize it, which in turn energizes the relay RY3 to be self-maintained by the contact *ry*3. At the same time, a timing section comprising the transistors Q17 and Q18 is fed to start an operation. In the timing section, a voltage divided by the resistors R14 and R15 constitutes an emitter voltage of the transistor Q17, which is charged to the capacitor C18 through the resistor R16 to form a base voltage after power is supplied. When this base voltage becomes lower than said emitter voltage, the transistor Q17 and subsequently the transistor Q18 are energized to make the base of the transistor Q14 free from a bias, and therefore the transistor Q14 is de-energized, thereby de-energizing the relay RY3 and stopping the power supply. The relay RY3 is de-energized in a similar way by the closing of the reset switch S11 and impulse-detecting relay contact ry8 and also by the energization of a power-failure stop detector circuit. The capacitor C19 is for decoupling. The purpose of provision of the power failure stop detector circuit is to prevent dial impulses from being erroneously transmitted when power failure is stopped during a reproducing operation of the device. The power failure stop detector circuit comprises the transistors Q19 and Q16 which are both energized under normal conditions. When power is supplied again (due to a stop of power failure), the capacitor C17 and resistors R17 and R18 cause the base voltage to lag behind the emitter voltage of the transistor Q19 and the transistor Q19 is de-energized instantaneously, so that the transistor Q16 is also de-energized and the 2-minute time and safety relay RY4 are not operated at the time of resupply of power. Consequently, the impulse relay contact *ry*1 is shortcircuited, the shunt relay contact *ry*2 is opened, and power supply to the main wire closing relay RY6 is stopped thereby to prevent transmission of dial impulses. (Description in more detail will appear later.)

The resistor R17 is connected in series with the capacitor C17 to prevent an erroneous operation due to a power change at the time other than the end of power failure.

The 2-minute timer circuit mentioned above supplies power to the speaker circuit, switching relay RY5 and the main wire closing relay RY6.

The switching operations of the dial impulse detector section and the telephone 364 will now be explained. The dial impulse detector section detects the closing of the hook switch HS of the telephone 364 or a taking up of the handset at the time of impulse transmission, and also the opening and closing of the impulse switch Di to perform a recording operation by means of a dial of the telephone 364 at the time of recording. More in detail, in order to detect the closing of the hook switch of the telephone 364 without reconstructing the telephone itself, the relay RY8 is inserted in series between the telephone lines P1 and P1' and telephone 364 so that the relay RY8 is energized by a current which flows in a closed loop completed with the closing of the hook switch as the handset is taken up. To secure this operation even during the energization of the main wire-closing relay RY6 or during the closing of a DC circuit of the telephone line by the relay contact ry6 and resistor R21, the telephone 364 is switched from the telephone line to the DC power supply by means of the switching relay contacts *ry*5-1 and *ry*5-2 and thereby the relay RY8 is energized. This is because the relay RY8 has to be high in sensitivity in view of the fact that variations of the DC resistance of the telephone line and the internal resistance RT of the telephone are large and that a small current flows into the telephone 364 with the closing of the hook switch HS if the DC circuit of the telephone line is closed by the resistor R21 (usually almost equal in resistance value to $R_T$). The high sensitivity means an increased number of turns of a coil which in turn results in an increased attenuation in the relay RY8, making it inappropriate to incorporate the relay RY8 into the telephone line. These problems are overcome by connecting the telephone 364 with a DC power supply when the telephone line is closed by the resistor R21.

The capacitor C21 is for improving the frequency characteristic when calling by means of the telephone 364, and the resistor R48 is for limiting a current. When the handset is taken up under the condition in which the telephone line is closed as described above, a DC current flows in the relay RY8 and thereby the contact ry8 is closed. Then the operation of the 2-minute timer is stopped and prohibited with the result that power supply to the speaker circuit, switching relay RY5 and closing relay RY6 is stopped at the same time. However, simultaneous cut off of power to the switching relay RY5 and closing relay RY6 causes an instantaneous opening of the telephone line (for several to 10-odd milliseconds) and a resulting generation of a false pulse due to a certain time required to energize the relay. This can be prevented by de-energizing the closing relay RY6 after the complete movement of the contacts *ry*5-1 and *ry*5-2 due to the de-energization of the switching relay RY5. Then the telephone line is closed by the telephone 364. For this purpose, the diode D12, resistor R19 and capacitor C20 constitute a delay circuit.

Also, at the time of recording, power may be supplied to the switching relay RY5 through the diode D9 to connect the telephone 364 to the d-c power supply in a similar way, and when the handset is taken up for a dialling operation, the relay contact ry8 is opened or closed in harmony with the impulse switch Di. Under this condition, since the capacitor C21 is cut off by the recording-reproduction change-over switch SA6, the operation of the relay is not delayed. Incidentally, all of the diodes D9, D10, D11 and D12 are for blocking a reverse current.

Reference is made now to a recording circuit. The recording circuit 367 is provided for the purpose of recording dial impulses on the magnetic tape 136 by making positive and negative DC currents flow in the magnetic head 138 in accordance with the opening and closing operations of the impulse switch Di of the telephone 364, and it comprises a bridge circuit including the resistors R23, R24 and R25, diode D15 and relay contact ry8. By operating the recording-reproduction change-over switches SA1 and SA2, the magnetic head 138 is connected with an output terminal of the bridge circuit, and positive and negative DC currents are made to flow in the magnetic head 138 in accordance with the opening and closing of the contact *ry*8. As to the operations of the contact *ry*8, it is needless to say that, as described above, dial impulses are recorded on the magnetic tape 136 in order to perform opening and closing operations according to the impulse switch Di.

Since it is only during the forward feed of the magnetic tape 136 that power is supplied to the recording circuit 367, there is no erasing operation performed during the reverse feed of the tape. Also, simultaneously with the power supply to the recording circuit 367, the indication lamp 335 is lighted and during this period a desired number may be dialled for recording.

The tape motor control section 357 will be described below. This section comprises a transistor Q20 for driving the motor 8, a transistor Q21 which together with the transistor Q20 constitutes a self-maintaining circuit and a transistor Q22 which constitutes a timing circuit. The timing of starting the motor is varied by operating the recording-reproduction change-over switches SA3 and SA4 which are interlocked with each other.

During reproducing operations, the interlocked switches SA3 and SA4 for recording-reproduction change-over are connected on the P side as shown in FIG. 49. Depression of the called party selecting button 276 on the keyboard 224 causes the start switch S2 to be closed and power is supplied to the timing circuit comprising the transistor Q22. Then a voltage divided by the resistors R27 and R28 is applied to the emitter of the transistor Q22. However, no voltage is applied immediately to the base thereof which is connected with the capacitor C25, and when the voltage is increased to a point higher than the emitter voltage by a charging operation due to the resistor R30, the transistor Q22 is energized. It is here assumed that it takes time $T_1$ from the closing of the switch S2 until the energization of the transistor Q22. The capacitor C26 is for absorbing ripples. When the magnetic head 138 reaches a predetermined track position, the solenoid 82 is energized, whereby the starting-point detecting switch S7 is closed and power is supplied also to the self-maintaining circuit comprising the transistors Q20 and Q21. However, since the capacitor C24 is connected with the base of the transistor Q20, the transistors Q20 and Q21 are de-energized. With the energization of the timing circuit consisting of the transistor Q22, a current flows through the diode D16 and the resistor R29 and therefore the transistors Q20 and Q21 of the self-maintaining circuit are energized thereby rotating the motor M1 and feeding the magnetic tape 136. The reason why the timing circuit is provided is that impulses have to transmitted only when a telephone exchange is ready to receive them after the telephone line is connected. However, since the time required for track selection varies with a position where the head is stopped and with a designated track position, the timing circuit is used to delay the feed of magnetic tape 117 by a certain time $T_1$. Also, the device is so constructed that the magnetic tape 136 begins to run on completion of track selection or the time $T_1$, whichever comes later, just in case no track selection is completed within time $T_1$. In this embodiment, the time $T_1$ is set at a sufficiently long period of about 3 seconds. For a recording operation, the capacitor C25 is connected in parallel with the capacitor C25', lengthening the period in which the timing circuit operates. Let the time limit in this case be $T_2$, which is set at about 15 seconds in this embodiment.

The transistors Q20 and Q21 which constitute a holding circuit are energized through the resistor R26 not only by the above-mentioned timing circuit but by closing the relay contact ry8 through the recording-reproduction change-over interlocked switch SA3. For this reason, as soon as the handset of the telephone 364 is taken up at the time of recording, the magnetic tape 136 is fed, on condition that track selection has been completed.

If the handset of the telephone 364 is not taken up in spite of the button 276 being depressed for recording, an unwanted current flows in the device for a long period of time, which is not only uneconomical but is a cause of a shorter life of the device. This also offers the problems of heat generation and safety. To solve these problems, the time constant of the timing circuit used for reproduction is changed for recording and a new time constant is employed for a safe timing circuit thereby to stop the device quickly.

The operation of the solenoid 30 for energizing the tape feed reversing means of the tape driving section will now be explained. During a reproducing operation, the solenoid 30 which comprises the transistors Q31 and Q32 is energized almost simultaneously with the closing of the tape edge detecting switch S8, while it is energized a little later at the time of recording. This is because a long-time use of the device causes a change in the number of turns by which the magnetic tape 136 is wound on the drum 124, which inevitably results in a distortion of the magnetic tape 136 especially at the end thereof. Then, a difference between recording and reproducing areas causes a reproduction to be made even to such a point of the magnetic tape 136 which is not excited, if the reproduced area is longer than the recorded area. As a consequence, a false pulse develops at a convertion point between excited and unexcited areas. In this embodiment, the base of the transistor Q31 is connected or not connected with the capacitor C34 according to whether the energization of the solenoid 30 is delayed or not. When recording, the capacitor C34 is connected with the power supply by means of the recording-reproduction change-over interlocked switch SA11, and therefore the base voltage of the transistor Q31 does not become lower the emitter potential divided by the resistors R49 and R50 even after the closing of the edge detecting switch S8. So, the transistor Q31 is energized only after the lapse of the time constant determined by the resistor R51 and capacitor C34, and thereby the transistor Q32 is energized and the solenoid 30 actuated. Then, the actuation of the reversing means causes the magnetic tape 136 to be reeled back and at the same time the switch S8 is opened. However, the energization of the solenoid 30 causes the switch S9 to be closed and therefore the transistor Q32 is energized, thereby maintaining the solenoid 30 energized. When the starting point of the magnetic tape is reached again, the starting point detecting switch S7 is opened and power supply to the solenoid 30 is stopped and de-energized. If the switch S7 is not opened when the tape reached the starting point, the overrun switch S12 is closed and thereby the self-maintenance of the solenoid 30 is stopped, de-energizing it. As a result, the magnetic tape 136 is reeled and fed toward the starting point or edge. The solenoid 307 is energized with the closing of the switch S9 (to the N.O side) or the reset switch S10, thereby restoring the button 276 of the keyboard to the original condition.

In a reproducing operation, the recording-reproduction change-over interlocked switch SA11 cuts off the capacitor C34 from the power supply and therefore no delaying action is performed, the solenoid SL3 being energized as soon as the switch S8 is closed. The resistor R52 is for discharging the capacitor C34, the diode D31 for blocking a reverse current, the diodes D27 and D32 for blocking a reverse current, the diodes D27 and D32 for absorbing a reversely induced voltage in the solenoids 307 and 30, and the diode D33 for blocking a reverse current.

The track selection system which includes the keyboard 224, the head position detecting section 354 and the head driving motor control circuit 355 will be explained now. This system is indicated by numeral 372 as a circuit enclosed by a broken line. The explanation of this circuit which was made in detail with reference to FIG. 49 will be limited to the diode D18 which has not yet been referred to. The transistor Q26 is biased in the reverse direction and the diode D18 is de-energized in the forward direction, when the starting edge detecting switch S7 (or operating switch 87 in the case of FIG. 48) is closed or the magnetic tape 136 is being fed. Thus, the magnetic head 138 is prevented from moving as the result of disappearance of the voltage across the DC solenoid 82 between the junction point 358 and the earth at the time of depressing the button 276 again on the keyboard 224 after the feed of the magnetic tape 136 and during the reverse feed of the magnetic tape 136.

The speaker circuit 368 will be explained below. The speaker circuit 368 which comprises the transformers TR2, TR3 and TR4, transistors Q27, Q28, Q29 and Q30, speaker 369, etc. performs voice amplification at the time of reproduction and transmits a ringing tone at the time of recording. A switching between these two operations is performed by the recording-reproduction change-over switches SA7, SA8 and SA9.

More in detail, the transistor Q28 amplifies a voice signal on the telephone line through the input transformer TR2 by means of the recording-reproduction change-over switch SA9 at the time of reproduction, and the push-pull power amplification is performed by means of the transistors Q29 and Q30, the speaker 369 making it audible. Part of the output is negatively fed back by the resistor R47 for the purpose of stabilization as an amplifier. It is also rectified by the diode D22, smoothed by a smoothing circuit comprising the resistors R44, R45 and R46 and capacitors C29 and C30, and then applied through another smoothing circuit comprising resistors R40 and R41 and capacitor C28 to the base of the transistors Q27 with an appropriate time constant. By taking advantage of the variations in collector impedance which result from the voltage applied to the base, the signal applied to the transistor Q28 is bypassed to give an AGC effect to the voice circuit.

When recording, the collector and base of the transistor Q28, capacitors C31, C32 and C33 and resistors R42 and R43 make up a phase-shifting circuit by operating the recording-reproduction change-over interlocked switch SA9. When the input transformer receives an input or a signal from outside, it is rectified by the diode D24 and applied to the base of the transistor Q27 through a smoothing circuit comprising the resistors R40 and R41 and capacitor C28 thereby to switch the transistor Q27. Consequently, the amount of phase to be shifted by the phase-shifting circuit is changed and thereby the oscillation of the transistor Q28 is controlled to form a tone ringer circuit.

Power is supplied to the speaker circuit through the diode D25 or D26. At the time of reproduction, this condition is made to continue by the operation of the contact *ry*3 of the relay RY3 from the time the device is started until the handset of the telephone 364 is picked up or time $T_3$ set by the timing circuit (W15 in FIG. 50) or until the device is reset. When recording, on the other hand, power is always supplied, and whenever a signal is received, a tone ringer is generated to indicate the receipt from outside.

The transformer TR3 is for driving, TR4 for producing an output, diode D23 for both biasing and temperature compensation and capacitor C34 for blocking the flow of a d-c current from the main wire. The diodes D5, D6, D7, D8, D13, D17, D20, D27 and D32 connected in parallel with the solenoid and the relay are provided for the purpose of absorbing an inverse voltage induced in the coil. Numerals 334, 335 and 336 show indication lamps which indicate various operating conditions. Numeral 336 shows a lamp for indicating a recording or reproducing operation, which, when lighted, indicates that the device is in an recording operation. Lamp 334 indicates that the device is in operation, while lamp 335 indicates that the magnetic tape 136 is running in the forward direction, that is to say, that impulses are being transmitted in reproduction or that a recording operation is possible.

Finally, the whole operations of the device will be explained with reference to FIG. 50 showing waveforms.

1. Recording operation

First, pulling the recording-reproduction switching button 252 to switch the recording-reproduction change-over interlocked switches SA1 to SA11 to the recording side or R side causes the recording-reproduction indication lamp 336 to be lighted, thereby indicating that the device is switched to a recording operation. At the same time, power is supplied through the diode D9 to the switching relay RY5 so that the contacts *ry*5-1 and *ry*5-2 are energized and the telephone is connected with a DC power supply through the resistor R48, while power is also supplied to the speaker circuit 368 through the diode D25. As a result, the input side of the input transformer TR2 is connected with the telephone line through the resistor R21 and capacitor C34, whereby oscillation occurs whenever a call signal is received from the telephone line, thus developing a singing from the speaker 369. In the next place, a recording track is designated by the button 276 on the keyboard. Assuming that the button (2,4) is depressed down to the point where it is locked (at time $t_0$ in FIG. 50), the starting switch S2 (W1 in FIG. 50) and the switches S3-2 and S4-4 of the switch groups S3 and S4 are closed and the indication lamp 334 is lighted to indicate that the device has started operating. Then the timing circuit (W4 in FIG. 50) comprising the transistor Q22 and with a time lag of $T_2$ is energized and power is supplied also to the head motor control section 355. So, the motor 180 starts (W2 in FIG. 50) and moves the head 138 to a designated track position. When the head reaches the designed track position, a circuit including the switches S3, S6, S5 and S4 is formed and hence the head motor control circuit 355 is controlled through the diode D19. Thus, not only the motor 180 is stopped (time $t_1$ in FIG. 50) but the solenoid 82 is attracted to brake the head driving section 356 and to close the starting edge detecting switch S7 (W3 in FIG. 50). With the closing of the switch S7, power is supplied to the recording circuit 367 comprising the resistors R23, R24, R25 and R26, diode D15 and relay contact *ry*8, the indication lamp 335 is lighted to indicate that the device is ready to record, and also power is supplied to the tape motor control circuit 357. Under this condition, taking up the handset of the telephone 364 (time $t_2$ in FIG. 50) causes the formation of a closed loop comprising the DC power supply, resistors R48, telephone 364, internal resistance and speech-monitoring relay RY8 (See W5 in FIG. 50 for the waveform of a current flowing in the telephone), and as a result the relay RY8 is energized to close the contact ry8. Then, the tape motor control circuit 357 is energized through the resistor R26, thereby rotating the head driving DC motor 8 (W6 in FIG. 50), so that the magnetic tape 117 is fed and at the same time a current i flows through the resistor R28, head 138, diode D15 and contact ry8 thereby to begin magnetizing the magnetic tape 136.

As the telephone number of a called party to be recorded is dialled, the dial impulse switch Di in the telephone 364 opens and closes in accordance with the dial number and the current flowing in the coil of relay RY8 is accordingly broken (W5 in FIG. 50), so that the relay contact *ry*8 alternates between openings and closings in accordance with the operations of the dial impulse switch Di. As a result, both positive and negative currents flow in the magnetic head 138 (W7 in FIG. 50. The currents *i* and $-i$ flow in the magnetic head H when the relay contact *ry*8 is closed and opened respectively.), thereby to magnetize the magnetic tape 136 both positively and negatively.

When the closing edge of the magnetic tape 136 is reached (time $t_4$ in FIG. 50), the closing edge detecting switch S8 is opened (W8 in FIG. 50). During a recording operation, however, the solenoid 30 is not energized until the delay circuit of transistor Q31 is energized by the change-over switch SA11 (time $t_5$ in FIG. 50), and therefore the magnetic tape 136 is magnetized too much. With the energization of the solenoid 30, the reversing means of the tape driving section 360 is actuated and the magnetic tape 136 is quickly reeled back with the switch S9 closed on the side of N.O (Time $t_5$, W9 in FIG. 50). Then the solenoid 307 is energized, the button 276 of the keyboard 224 is restored to the original position, the start switch S2 is opened and then the switches in the groups S3 and S4 which are closed are opened. As a result power supply to the solenoid 82 is stopped, de-energizing the same, and the lever 71 is restored. Since the lockpin 70 is on the periphery of the metal ring 67, the starting edge detecting switch $S_7$ is not opened. As the magnetic tape 136 is fed back to the starting edge, the notch 69 on the metal ring 67 is fitted with the lockpin 126 and hence the starting edge detecting switch S7 is opened, thereby de-energizing the solenoids 307 and 30 and stopping feeding the device (Time $t_6$ in FIG. 50). The handset may be put back at any time after $t_5$. Incidentally, after the start of the device ($t_0$), the magnetic tape 136 automatically begins to feed by means of the timing device (comprising the transistor Q22 and having the time lag of $T_2$) unless the handset is taken up, and hence the magnetic tape is reversely reeled back, causing the operation of the device to be stopped.

2. Reproducing operation or playback

First, the interlocked change-over switches SA1 to SA11 are switched to reproduction or the P side (shown by the contact condition of FIG. 49) by depressing the recording-reproduction change-over button 252. The recording-reproduction indication lamp 336 goes out, indicating the condition of reproduction. Next, the track position where the telephone number of a party to be called is recorded is selected with the button 276 on the keyboard 224. Depressing the selected button (time $t_6$ in FIG. 50) causes the start switch $S_2$ to be closed (W10 in FIG. 50) and the lamp PL2 is lighted to indicate that the device has started operation. At the same time, power is supplied to the impulse relay RY1, closing the contact ry1 (W17 in FIG. 50), so that the relay RY3 is self-maintained (W15 in FIG. 50) and thereby the switching relay RY5 and the closing relay RY6 are energized. Thus, the telephone is switched from the telephone line to the DC power supply through the contacts *ry*5-1 and *ry*5-2, while at the same time closing the telephone line by means of the contact *ry*6, making a dial tone audible by way of the speaker 369 from the main wire.

On completion of the track selection (See the paragraph of Recording for track selection) at time $t_1'$ in FIG. 50, the starting edge detecting switch S7 is closed (W12 in FIG. 50) and thereby the transistor Q8 is de-energized, thus releasing the locked condition of a flip-flop comprising the transistors Q6 and Q7. This causes power to be supplied to the shunt relay RY2 and the safety relay RY4 is self-maintained, thereby switching the relay contact *ry*4-2 to the N.O side. Then, impulse transmission to the main wire is made possible by the operation of the impulse relay RY1.

With the energization of the timing circuit of the transistor Q22 (with time lag $T_1$) at time $t_2'$ in the wave W13 in FIG. 50, the tape driving motor 8 is started to feed the magnetic tape 117 (W14 in FIG. 50) while at the same time the transistor Q8 is de-energized, releasing the locking of the flip-flop comprising the transistors Q6 and Q7. A signal reproduced (W16 in FIG. 50) by the magnetic head 138 is sufficiently amplified by the amplifier section 361 and the switching amplifier section 362, thus setting and resetting the flip-flop of the impulse transmission section 363 according to the number recorded. The output of this flip-flop energizes the impulse relay RY1 to send out to the telephone line 270 impulses corresponding to dial impulses (W17 in FIG. 50), while a delayed output of the flip-flop energizes the shunt relay RY2 to shunt a click generated at the time of transmitting impulses (W18 in FIG. 50). As the end of the magnetic tape 136 is reached, the end detecting switch S8 is closed ($t_3'$, W19 in FIG. 50). In reproduction, the transistor Q31 has no delaying function and therefore immediately energizes the solenoid 30 (W20 in FIG. 50) which in turn actuates the reversing means of the tape driving section 360. Thus, the magnetic tape 136 is reversely fed and comes to a stop at the starting point ($t_4'$ in FIG. 50). When the handset is picked up at a given time, the hook switch HS of the telephone is closed and thereby a current flows in the relay RY8, closing the relay contact *ry*8. As a consequence, the power-controlling relay RY3 stops being self-maintained and no power is supplied to the speaker circuit 368, switching relay RY5, main wire closing relay RY6 and timing circuit (with the time lag of $T_3$). So, an answer tone goes out and the relay contacts *ry*6-1 and *ry*6-2 are switched to the side of the telephone line to switch the telephone from the DC power supply to the main wire, while the telephone line closing relay contact *ry*6 is restored a little later due to the capacitor C20. After that, the telephone line is closed by the telephone 364 and the timing circuit stops operating, thus enabling an ordinary speech by the telephone 364 after transmitting impulses. In this connection, if the handset is not picked up, the main wire is automatically opened after the lapse of $T_3$ due to the timing circuit. If the line is found busy or a called party is selected erroneously after the device has started operation, depression of the reset button 277 causes the magnetic tape to be immediately fed in the reverse direction, restoring the device to the condition before the start.

The indication lamp 336 is not lighted during a reproducing operation, while the lamp 334 is lighted from the time $t_0'$ to $t_4'$, indicating that the device is in operation during that period. Also, the lamp 335 is kept lighted from time $t_1'$ to $t_3'$ to indicate that the magnetic tape 136 is being fed in the forward direction.

The conventional automatic dialling device either has a subscriber's telephone placed on it on the desk or has a device proper with an operating section disposed near the telephone on the user's desk or the like while installing outside separately a part of the power supply and an auxiliary dialling device for generating recording signals. Since the operating buttons of these automatic dialling devices are provided on the device proper, a large space is occupied very inconveniently by it together with the telephone. In addition, the bulkiness of the device makes it difficult to move it during an office cleaning.

The automatic dialling device according to the present invention, as shown in FIG. 51, has a keyboard device 501 placed within the reach of a user, while the device proper 504 can be separately disposed on the side wall, for example, of the user's desk. In this way, a small space is occupied on the desk by the relatively small-sized telephone 502 and the keyboard device 501 only, thereby facilitating both the maintenance and handling of the device.

Further, as shown in FIG. 52, a unit of telephone 502 and device proper 504 may be jointly used by a plurality of keyboard devices 501' and 501'' which are additionally connected in parallel. It is also possible to install a telephone which is, so to speak, a child of the telephone 502. Moreover, when the main wire P2 is added to P1, any of the main wires which is available can be used for speech by any of the telephones 502 and 502' by switching the plurality of telephones 502 and 502' and device proper 504 to be connected with the telephone lines P1 and P2.

What is claimed is:

1. An automatic dialling device comprising means for feeding a wide magnetic tape, a tape feed control circuit for controlling a start and stop of said feeding means, a head moving system for moving a magnetic head in a direction perpendicular to the direction of the feed of said magnetic tape, head position detecting means comprising rotary switch means including at least one rotary switch having a plurality of fixed contacts corresponding to predetermined passages for tracks on the magnetic tape and a movable contact mounted movably to be in response to the movement of said magnetic head, switch group means including at least one switch group with a plurality of push buttons independently operable for designating a party to be called, a control circuit for producing a start signal for starting the operation of said head moving system in response to the designation of a party to be called by said switch group means and producing a stop signal for stopping the operation of said head moving system when a predetermined circuit is completely formed between said rotary switch means and said switch group, a recording circuit for applying dial signals of a telephone to said magnetic head and recording said signals on said magnetic tape, a reproducing circuit for reproducing and transmitting to a telephone line said dial signals recorded on said magnetic tape, and a voice amplifier circuit for confirming the response of a called party when an automatic dialling operation is conducted with a handset placed on the telephone.

2. An automatic dialling device according to claim 1, in which said push buttons are arranged in a plurality of columns and in a plurality of rows, rotary shafts are arranged under said push buttons in the form of a lattice corresponding to said columns and rows, tongues pressed by said push buttons for rotating said rotary shafts are provided at the positions on said rotary shafts corresponding to said push buttons, and switches for detecting the rotation of said rotary shafts are provided, said switches are combined to constitute switch groups for designating and specifying parties to be called.

3. An automatic dialling device according to claim 1, in which two rollers for alternatively taking up magnetic tape are provided, one of said rollers being coupled to a first gear and the other roller coupled to a second gear, a third gear in mesh with said first gear is coupled through an elastic element to a fourth gear in mesh with said second gear, said rollers being biased in opposite directions of rotation by said elastic element on the same shaft in such a manner that said two rollers receive the turning effort in opposite directions, thereby to constitute said feeding means.

4. An automatic dialling device according to claim 3, in which a head pad arm for pressing the magnetic tape to the magnetic head is supported on the shaft or the support frame of one of said rollers so as to be rotatable in one direction by means of a spring.

5. An automatic dialling device according to claim 3, in which one of said rollers is provided with a fifth gear, first and second idler gears which can engage with said fifth gear being supported on a movable operating plate, a means being provided which drives in opposite directions third and fourth idler gears in mesh with said two idler gears respectively and mounted on the same shaft as said operating plate, the direction of the feed of the magnetic tape being determined by moving said operating plate.

6. An automatic dialling device according to claim 1, in which said head moving system comprises a head guide block supporting said magnetic head in such a manner that said magnetic head is slidable in the transverse direction of the magnetic tape, a timing belt for pulling said magnetic head along said guide block, and an intermittent driving means for driving the pulley of said timing belt intermittently.

7. An automatic dialling device according to claim 2, in which transparent caps are provided on the head of said push buttons, and a space into which a card with a mark indicating a party to be called is provided between said head and said cap.

8. An automatic dialling device according to claim 5, in which a head pad arm for pressing the magnetic tape to the magnetic head is supported on the shaft or support frame of one of said rollers in such a manner as to be rotatable in one direction by a spring, and a movable piece for pressing said head pad arm against the righting moment of said spring is provided, said movable piece and said operating plate being interlocked in operation, said magnetic head being released from the contact with said magnetic tape when rewinding said magnetic tape.

9. An automatic dialling device according to claim 1, in which an amplifier for amplifying a voice and a first transistor for automatically controlling the amplification degree constitute said voice amplifier circuit and a positive feed-back circuit for said amplifier is connected to said first transistor at the time of receiving a transmitted signal by the operation of a recording-reproduction change-over switch, thereby to generate a ringing tone.

10. An automatic dialling device according to claim 1, in which a tape driving means is started with the closing of a hook switch of the telephone at the time of recording.

11. An automatic dialling device according to claim 1, in which a DC voltage is applied to a series circuit including the telephone and a driving coil of a first relay, a contact of said first relay being provided in the tape feed control circuit, the tape driving means being started by a current made to flow in said driving coil with the closing of a hook switch of the telephone at the time of recording.

12. An automatic dialling device according to claim 1, in which a start switch for intermittently supplying power to the tape feed control circuit, said switch automatically opening when the magnetic tape returns to a starting point of the feed is provided in the tape feed control circuit, and a timing circuit which begins to operate with the closing of said start switch and starts the feed of said magnetic tape by controlling said tape feed control circuit if a hook switch of the telephone is opened with a certain time lag behind the closing of said start switch.

13. An automatic dialling device according to claim 12, in which the time lag of a timing circuit is variable according to the operation of a recording-reproduction change-over switch.

14. An automatic dialling device according to claim 1, in which a timing device which begins to operate after the closing of a telephone line at the time of reproduction is provided and a means for actuating the tape feed control circuit by means of a signal generated by said timing device or the head position detecting means, whichever comes later, is provided.

15. An automatic dialling device according to claim 1, in which the telephone is connected in series with a driving coil of a first relay, a second relay with contacts which can switch said series circuit between the telephone line and the DC power supply is provided, a recording circuit for recording dial impulses on the magnetic tape in accordance with the openings and closings of said contacts of the first relay is provided, and a third relay with contacts which closes said telephone line when reproducing said signals recorded on said magnetic tape is provided.

16. An automatic dialling device according to claim 1, in which the head moving system is controlled by detecting whether the track position determined through the operation of push buttons is in the right half or left half thereby to determine the direction in which the feed of the magnetic tape is started.

17. An automatic dialling device according to claim 1, in which a switch for detecting that the magnetic head has reached either end of the magnetic tape is provided, the head moving system controlling circuit being controlled in accordance with the operations of said switch thereby to reverse the direction of the magnetic head movement.

18. An automatic dialling device according to claim 1, in which a control signal by which the time to reverse the feed of the magnetic tape for recording is lagged behind the time to reverse the feed of the magnetic tape for reproduction is generated in the tape feed control circuit, and the feeding means is controlled by said control signal thereby to prevent erroneous pulses from being transmitted to the telephone line.

19. An automatic dialling device according to claim 1, in which a first relay with a normally-open contact connected in such a manner as to short-circuit an impulse-transmitting relay contact is provided, a second relay with a normally-open contact for holding the telephone line at the time of an automatic call is provided, an actuating circuit with a self-maintaining function for actuating said first and second relays is provided, and a timing circuit which operates only when power is supplied is provided, said timing circuit temporarily stopping the operation of said actuating circuit thereby to prevent erroneous operations at the time of supplying power.

20. An automatic dialling device according to claim 1, in which the magnetic tape, feeding means, tape feed control circuit, magnetic head, head moving system, head position detecting means, head moving system control circuit, recording circuit, reproducing circuit and voice amplifier circuit are contained in a case as a device proper and the switch groups are contained in another case as a keyboard device, said device proper being connected with said keyboard device by means of electric wires.

21. An automatic dialling device according to claim 20, in which said device proper is connected with a plurality of keyboard devices which are in turn connected in parallel with each other.

* * * * *